US008805918B1

(12) United States Patent  
Chandrasekaran et al.

(10) Patent No.: US 8,805,918 B1  
(45) Date of Patent: Aug. 12, 2014

(54) METHODS AND APPARATUS FOR IMPLEMENTING EXCHANGE MANAGEMENT FOR VIRTUALIZATION OF STORAGE WITHIN A STORAGE AREA NETWORK

(75) Inventors: Varagur V. Chandrasekaran, Fremont, CA (US); Ramesh Sivakolundu, Saratoga, CA (US); Dennis Kai-Fat Fong, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 2430 days.

(21) Appl. No.: 10/242,374

(22) Filed: Sep. 11, 2002

(51) Int. Cl.
 *G06F 15/16* (2006.01)
 *G06F 15/177* (2006.01)

(52) U.S. Cl.
 USPC ............................ 709/200; 709/220; 709/229

(58) Field of Classification Search
 USPC ........................................................ 709/200
 See application file for complete search history.

(56) References Cited

U.S. PATENT DOCUMENTS

| | | | |
|---|---|---|---|
| 5,617,421 A | | 4/1997 | Chin et al. |
| 5,740,171 A | | 4/1998 | Mazzola et al. |
| 5,742,604 A | * | 4/1998 | Edsall et al. .................. 370/401 |
| 5,764,636 A | | 6/1998 | Edsall |
| 5,809,285 A | | 9/1998 | Hilland |
| 5,999,930 A | | 12/1999 | Wolff |
| 6,035,105 A | | 3/2000 | McCloghrie et al. |
| 6,101,497 A | | 8/2000 | Ofek |
| 6,148,414 A | | 11/2000 | Brown et al. |
| 6,188,694 B1 | | 2/2001 | Fine et al. |
| 6,202,135 B1 | | 3/2001 | Kedem et al. |
| 6,208,649 B1 | * | 3/2001 | Kloth ............................ 370/392 |
| 6,209,059 B1 | | 3/2001 | Ofer et al. |

(Continued)

FOREIGN PATENT DOCUMENTS

| | | |
|---|---|---|
| JP | 2000 242434 A | 9/2000 |
| WO | WO 00/52576 | 9/2000 |
| WO | WO 01/80013 A1 | 10/2001 |
| WO | WO 03/084106 | 9/2003 |

OTHER PUBLICATIONS

PCT *International Search Report*, Application No. PCT/US 2003/00883, Int'l filing date Jan. 10, 2003, mailed Mar. 11, 2005.

(Continued)

*Primary Examiner* — John Follansbee  
*Assistant Examiner* — Alan S Chou  
(74) *Attorney, Agent, or Firm* — Novak Druce Connolly Bove + Quigg LLP

(57) ABSTRACT

Methods and apparatus for managing exchanges in a network device of a storage area network are disclosed. In a first "host-side" exchange initiated by an initiator and between the initiator and the network device, one or more frames are received from an initiator and/or sent to the initiator. At least one of the frames pertains to access of a virtual storage location of a virtual storage unit representing one or more physical storage locations on one or more physical storage units of the storage area network. One or more "disk-side" exchanges between the network device and one or more targets (i.e., physical storage units) are initiated in response to the first exchange. In the disk-side exchanges, one or more frames are sent from the network device to one of the targets and/or received from the target. Exchange information for the host-side exchange and the associated disk-side exchanges are updated throughout the exchanges.

64 Claims, 15 Drawing Sheets

(56) References Cited

U.S. PATENT DOCUMENTS

| | | | |
|---|---|---|---|
| 6,219,699 B1 | 4/2001 | McCloghrie et al. | |
| 6,226,771 B1 | 5/2001 | Hilla et al. | |
| 6,260,120 B1 | 7/2001 | Blumenau et al. | |
| 6,266,705 B1 | 7/2001 | Ullum et al. | |
| 6,269,381 B1 | 7/2001 | St. Pierre et al. | |
| 6,269,431 B1 | 7/2001 | Dunham | |
| 6,295,575 B1 | 9/2001 | Blumenau et al. | |
| 6,400,730 B1 | 6/2002 | Latif et al. | |
| 6,542,961 B1* | 4/2003 | Matsunami et al. | 711/114 |
| 6,683,883 B1 | 1/2004 | Czeiger et al. | |
| 6,772,231 B2* | 8/2004 | Reuter et al. | 710/8 |
| 6,847,647 B1* | 1/2005 | Wrenn | 370/395.32 |
| 6,850,955 B2* | 2/2005 | Sonoda et al. | 707/200 |
| 6,880,062 B1 | 4/2005 | Ibrahim et al. | |
| 6,898,670 B2* | 5/2005 | Nahum | 711/114 |
| 6,907,419 B1* | 6/2005 | Pesola et al. | 707/1 |
| 6,952,734 B1* | 10/2005 | Gunlock et al. | 709/227 |
| 6,978,300 B1 | 12/2005 | Beukema et al. | |
| 6,983,303 B2* | 1/2006 | Pellegrino et al. | 709/203 |
| 6,986,015 B2 | 1/2006 | Testardi | |
| 7,200,144 B2 | 4/2007 | Terrell et al. | |
| 7,237,045 B2 | 6/2007 | Beckmann et al. | |
| 7,269,168 B2 | 9/2007 | Roy et al. | |
| 7,277,431 B2 | 10/2007 | Walter et al. | |
| 7,353,305 B2 | 4/2008 | Pangal et al. | |
| 2002/0053009 A1 | 5/2002 | Selkirk et al. | |
| 2002/0083120 A1 | 6/2002 | Soltis | |
| 2002/0095547 A1 | 7/2002 | Watanabe et al. | |
| 2002/0103889 A1 | 8/2002 | Markson et al. | |
| 2002/0103943 A1 | 8/2002 | Lo et al. | |
| 2002/0112113 A1 | 8/2002 | Karpoff et al. | |
| 2002/0120741 A1 | 8/2002 | Webb et al. | |
| 2003/0131105 A1* | 7/2003 | Czeiger et al. | 709/225 |
| 2003/0131182 A1 | 7/2003 | Kumar et al. | |
| 2003/0159058 A1 | 8/2003 | Eguchi | |
| 2003/0185154 A1 | 10/2003 | Mullendore et al. | |
| 2003/0210686 A1 | 11/2003 | Terrell et al. | |
| 2004/0030857 A1 | 2/2004 | Krakirian et al. | |
| 2004/0039939 A1 | 2/2004 | Cox et al. | |
| 2004/0057389 A1 | 3/2004 | Klotz et al. | |
| 2004/0088574 A1 | 5/2004 | Walter et al. | |
| 2005/0050211 A1 | 3/2005 | Kaul et al. | |
| 2005/0076113 A1 | 4/2005 | Klotz et al. | |
| 2005/0091426 A1 | 4/2005 | Horn et al. | |
| 2005/0117522 A1 | 6/2005 | Basavaiah et al. | |
| 2005/0117562 A1* | 6/2005 | Wrenn | 370/351 |

OTHER PUBLICATIONS

European Office Action dated Jun. 8, 2007 from related European Office Action No. 02797469.0, 13 pages.

Examiner's Communication (The First Office Action) dated Apr. 7, 2006, from related Chinese Patent Application No. 02828446.1 English translation, 10 pages; and the non-translated original in Chinese, 10 pages.

Vuppala, Vibhavasu and Ni, Lionel M.: "Layer-3 Switching Using Virtual Network Ports," Computer Communications and Networks, 1999. Proceedings. Eight International Conference on Boston, MA, USA Oct. 11-13, 1999, Piscataway, NJ, USA, IEEE. ISBN: 0-7803-5794-9; pp. 642-648.

U.S. Office Action dated May 31, 2005 from related U.S. Appl. No. 10/045,883, 17 pages.

U.S. Office Action dated Oct. 4, 2005 from related U.S. Appl. No. 10/045,883, 15 pages.

U.S. Office Action dated Mar. 21, 2006 from related U.S. Appl. No. 10/045,883, 17 pages.

U.S. Office Action dated Jul. 28, 2006 from related U.S. Appl. No. 10/045,883, 15 pages.

U.S. Office Action dated Feb. 8, 2007 from related U.S. Appl. No. 10/045,883, 16 pages.

U.S. Office Action dated Jul. 23, 2007 from related U.S. Appl. No. 10/045,883, 16 pages.

U.S. Office Action dated Jan. 10, 2008 from related U.S. Appl. No. 10/045,883, 17 pages.

Monia et al., "IFCP-A Protocol for Internet Feibre Channel Networking", Dec. 2002, www.ietf.org/lid-abstracts.txt.

U.S. Office Action dated May 3, 2006 from related U.S. Appl. No. 10/726,269 16 pages.

U.S. Office Action dated Sep. 29, 2006 from related U.S. Appl. No. 10/726,269, 15 pages.

U.S. Office Action dated Jul. 16, 2007 from related U.S. Appl. No. 10/726,269, 16 pages.

"Fibre Channel—Fabric Generic Requirements (FC-FG)", Dec. 4, 1996, American National Standards Institute, Inc.

U.S. Office Action dated Nov. 14, 2007 from related U.S. Appl. No. 10/726,269, 16 pages.

International Search Report dated Oct. 22, 2004 from related PCT Application No. PCT/US02/41079, 6 pages.

Australian Office Action dated May 13, 2008 from related AU Application No. 2002361837, 3 pages.

U.S. Office Action dated Jun. 27, 2008 from related U.S. Appl. No. 10/726,269, 16 pages.

International Search Report dated May 23, 2006 from related PCT Application No. PCT/US2004/039904, 3 pages.

U.S. Office Action dated Aug. 1, 2008 from related U.S. Appl. No. 10/045,883, 12 pages.

Examiner's Communication (The First Office Action) dated Jul. 4, 2008 from Chinese Patent Application No. 200480033685.4 English translation, 10 pages; and the non-translated original in Chinese, 10 pages.

European Office Action dated Jun. 16, 2008 from corresponding European Office Action No. 02797469.0, 10 pages.

Australian Office Action dated Oct. 9, 2008 from related AU Application No. 2004311001, 2 pages.

Japanese Office Action dated Dec. 9, 2008 from related Japanese Patent Application No. 2003-560717.

U.S. Office Action dated Jan. 7, 2009 from U.S. Appl. No. 10/726,269, 16 pages.

Notice of Allowance and Allowed Claims dated Feb. 9, 2009 from U.S. Appl. No. 10/045,883; 55 pgs.

* cited by examiner

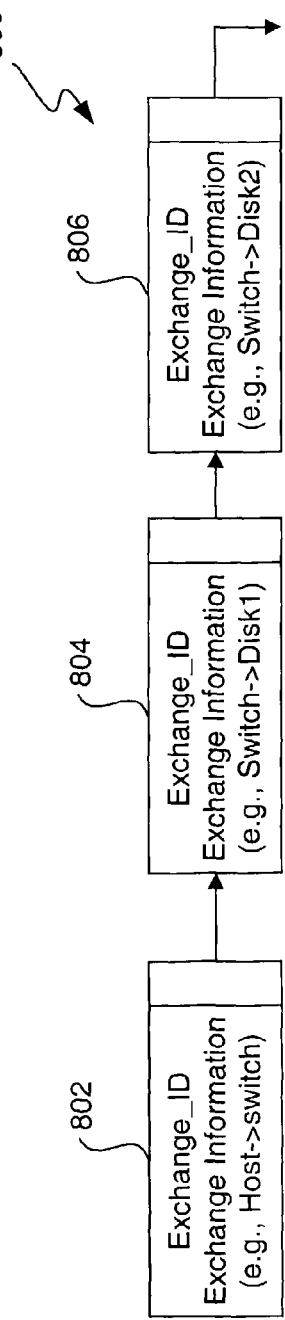

METHODS AND APPARATUS FOR IMPLEMENTING EXCHANGE MANAGEMENT FOR VIRTUALIZATION OF STORAGE WITHIN A STORAGE AREA NETWORK

BACKGROUND OF THE INVENTION

1. Field of the Invention

The present invention relates to network technology. More particularly, the present invention relates to methods and apparatus for supporting virtualization of storage within a storage area network.

2. Description of the Related Art

In recent years, the capacity of storage devices has not increased as fast as the demand for storage. Therefore a given server or other host must access multiple, physically distinct storage nodes (typically disks). In order to solve these storage limitations, the storage area network (SAN) was developed. Generally, a storage area network is a high-speed special-purpose network that interconnects different data storage devices and associated data hosts on behalf of a larger network of users. However, although a SAN enables a storage device to be configured for use by various network devices and/or entities within a network, data storage needs are often dynamic rather than static.

FIG. 1A illustrates an exemplary conventional storage area network. More specifically, within a storage area network 102, it is possible to couple a set of hosts (e.g., servers or workstations) 104, 106, 108 to a pool of storage devices (e.g., disks). In SCSI parlance, the hosts may be viewed as "initiators" and the storage devices may be viewed as "targets." A storage pool may be implemented, for example, through a set of storage arrays or disk arrays 110, 112, 114. Each disk array 110, 112, 114 further corresponds to a set of disks. In this example, first disk array 110 corresponds to disks 116, 118, second disk array 112 corresponds to disk 120, and third disk array 114 corresponds to disks 122, 124. Rather than enabling all hosts 104-108 to access all disks 116-124, it is desirable to enable the dynamic and invisible allocation of storage (e.g., disks) to each of the hosts 104-108 via the disk arrays 110, 112, 114. In other words, physical memory (e.g., physical disks) may be allocated through the concept of virtual memory (e.g., virtual disks). This allows one to connect heterogeneous initiators to a distributed, heterogeneous set of targets (storage pool) in a manner enabling the dynamic and transparent allocation of storage.

The concept of virtual memory has traditionally been used to enable physical memory to be virtualized through the translation between physical addresses in physical memory and virtual addresses in virtual memory. Recently, the concept of "virtualization" has been implemented in storage area networks through various mechanisms. Virtualization interconverts physical storage and virtual storage on a storage network. The hosts (initiators) see virtual disks as targets. The virtual disks represent available physical storage in a defined but somewhat flexible manner. Virtualization provides hosts with a representation of available physical storage that is not constrained by certain physical arrangements/allocation of the storage.

One early technique, Redundant Array of Independent Disks (RAID), provides some limited features of virtualization. Various RAID subtypes have been implemented. In RAID1, a virtual disk may correspond to two physical disks 116, 118 which both store the same data (or otherwise support recovery of the same data), thereby enabling redundancy to be supported within a storage area network. In RAID0, a single virtual disk is striped across multiple physical disks. Some other types of virtualization include concatenation, sparing, etc. Some aspects of virtualization have recently been achieved through implementing the virtualization function in various locations within the storage area network. Three such locations have gained some level of acceptance: virtualization in the hosts (e.g., 104-108), virtualization in the disk arrays or storage arrays (e.g., 110-114), and virtualization in a storage appliance 126 separate from the hosts and storage pool. Unfortunately, each of these implementation schemes has undesirable performance limitations.

Virtualization in the storage array is one of the most common storage virtualization solutions in use today. Through this approach, virtual volumes are created over the storage space of a specific storage subsystem (e.g., disk array). Creating virtual volumes at the storage subsystem level provides host independence, since virtualization of the storage pool is invisible to the hosts. In addition, virtualization at the storage system level enables optimization of memory access and therefore high performance. However, such a virtualization scheme typically will allow a uniform management structure only for a homogenous storage environment and even then only with limited flexibility. Further, since virtualization is performed at the storage subsystem level, the physical-virtual limitations set at the storage subsystem level are imposed on all hosts in the storage area network. Moreover, each storage subsystem (or disk array) is managed independently. Virtualization at the storage level therefore rarely allows a virtual volume to span over multiple storage subsystems (e.g., disk arrays), thus limiting the scalability of the storage-based approach.

When virtualization is implemented on each host, it is possible to span multiple storage subsystems (e.g., disk arrays). A host-based approach has an additional advantage, in that a limitation on one host does not impact the operation of other hosts in a storage area network. However, virtualization at the host-level requires the existence of a software layer running on each host (e.g., server) that implements the virtualization function. Running this software therefore impacts the performance of the hosts running this software. Another key difficulty with this method is that it assumes a prior partitioning of the available storage to the various hosts. Since such partitioning is supported at the host-level and the virtualization function of each host is performed independently of the other hosts in the storage area network, it is difficult to coordinate storage access across the hosts. The host-based approach therefore fails to provide an adequate level of security. Due to this security limitation, it is difficult to implement a variety of redundancy schemes such as RAID which require the "locking" of memory during read and write operations. In addition, when mirroring is performed, the host must replicate the data multiple times, increasing its input-output and CPU load, and increasing the traffic over the SAN.

Virtualization in a storage area network appliance placed between the hosts and the storage solves some of the difficulties of the host-based and storage-based approaches. The storage appliance globally manages the mapping and allocation of physical storage to virtual volumes. Typically, the storage appliance manages a central table that provides the current mapping of physical to virtual. Thus, the storage appliance-based approach enables the virtual volumes to be implemented independently from both the hosts and the storage subsystems on the storage area network, thereby providing a higher level of security. Moreover, this approach supports virtualization across multiple storage subsystems. The key drawback of many implementations of this architecture is that every input/output (I/O) of every host must be sent through the storage area network appliance, causing significant performance degradation and a storage area network bottleneck. This is particularly disadvantageous in systems supporting a redundancy scheme such as RAID, since data must be mirrored across multiple disks. In another storage appliance-based approach, the appliance makes sure that all hosts receive the current version of the table. Thus, in order to enable the hosts to receive the table from the appliance, a software shim from the appliance to the hosts is required, adding to the complexity of the system. Moreover, since the software layer is implemented on the host, many of the disadvantages of the host-based approach are also present.

In view of the above, it would be desirable if various storage devices or portions thereof could be logically and dynamically assigned to various devices and/or entities within a network. Moreover, it would be beneficial if such a mechanism could be implemented to support the virtualization of storage within a SAN without the disadvantages of traditional virtualization approaches.

SUMMARY OF THE INVENTION

Methods and apparatus for implementing virtualization of storage in a storage area network are disclosed. This is accomplished through the use of one or more network devices capable of being placed in a data path between the hosts and the storage devices. As a result, neither the storage devices nor the hosts require additional software or hardware to support storage virtualization. Thus, the present invention is superior to the host based approach, which requires that each host be burdened by additional software to implement virtualization functionality. Moreover, the present invention enables multiple network devices to simultaneously manage the virtualization of heterogeneous storage devices. Importantly, switch-based virtualization may be implemented on a per port basis. Any number of ports on a switch can manage virtualization of its own traffic. This allows a network's virtualization capacity to scale with the number of ports. Since there are large numbers of ports in any network system, there will nearly always be sufficient bandwidth for virtualization. Accordingly, virtualization of storage may be achieved without many of the drawbacks present in conventional virtualization schemes.

Fibre Channel defines several types of ports. Any port on a node device, such as a disk or PC is an N_Port, as compared with a port on a Fabric, which is an F_Port. The highest level Fibre Channel mechanism used for communication between N_Ports is an exchange, which may be bidirectional or unidirectional. Although the use of the Fibre Channel terminology will be used herein to describe the management of exchanges, the present invention may also be used to manage exchanges in other protocols and communication mediums. Thus, the term "exchange" will be used herein to refer generally to any unidirectional or bidirectional communication between two ports.

In accordance with one aspect of the invention, methods and apparatus for managing exchanges in a network device of a storage area network are disclosed. In a first "host-side" exchange initiated by an initiator and between the initiator and the network device, one or more frames are received from an initiator and/or sent to the initiator. At least one of the frames pertains to access of a virtual storage location of a virtual storage unit representing one or more physical storage locations on one or more physical storage units of the storage area network. In addition, one or more additional "disk-side" exchanges are initiated in response to the first exchange. Each of the disk-side exchanges is between the network device and a target (i.e., one of the physical storage units). In each disk-side exchange, one or more frames are sent from the network device to the target and/or received from the target. Exchange information for the host-side exchange and the associated disk-side exchanges are updated throughout the exchanges.

In accordance with another aspect of the invention, the host-side and related disk-side exchange(s) are maintained in an exchange state table in which each exchange is identified by an exchange identifier. Through a data structure such as a linked list, the host-side exchange is linked to one or more associated disk-side exchanges. This enables exchange information for an exchange to be retrieved, added, deleted, or otherwise modified. Retrieved exchange information may also be used to compose frames to be sent in that exchange as well as those to be sent in another related exchange. The exchange information in the exchange state table is continually updated as frames are received and/or sent in the host-side and disk-side exchange(s). In this manner, the host-side exchange and the related disk-side exchanges are coupled until the exchanges are no longer pending.

In accordance with yet another aspect of the invention, the present invention is implemented on a per-port basis. In other words, selected virtualization ports of one or more network devices may implement virtualization and exchange management functionality in hardware and/or software. This allows virtualization processing and exchange management to scale with the number of ports. Accordingly, the present invention provides far greater bandwidth for virtualization than can be provided with host based or storage based virtualization schemes.

Various network devices may be configured or adapted for intercepting, generating, modifying, and transmitting packets, frames and data structures to implement the disclosed virtualization and exchange management functionality. These network devices include, but are not limited to, servers (e.g., hosts), routers, and switches. Moreover, the functionality for the disclosed virtualization and exchange management processes may be implemented in software as well as hardware.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, packets, frames and data structures having the format described herein and provided on appropriate media are part of this invention.

These and other features of the present invention will be described in more detail below in the detailed description of the invention and in conjunction with the following figures.

BRIEF DESCRIPTION OF THE DRAWINGS

FIG. 7 is a diagram illustrating an exemplary VLUN access configuration table.

FIG. 8 is a diagram illustrating a mechanism for linking exchange information in accordance with various embodiments of the invention.

DETAILED DESCRIPTION OF THE PREFERRED EMBODIMENTS

Figure 1A:
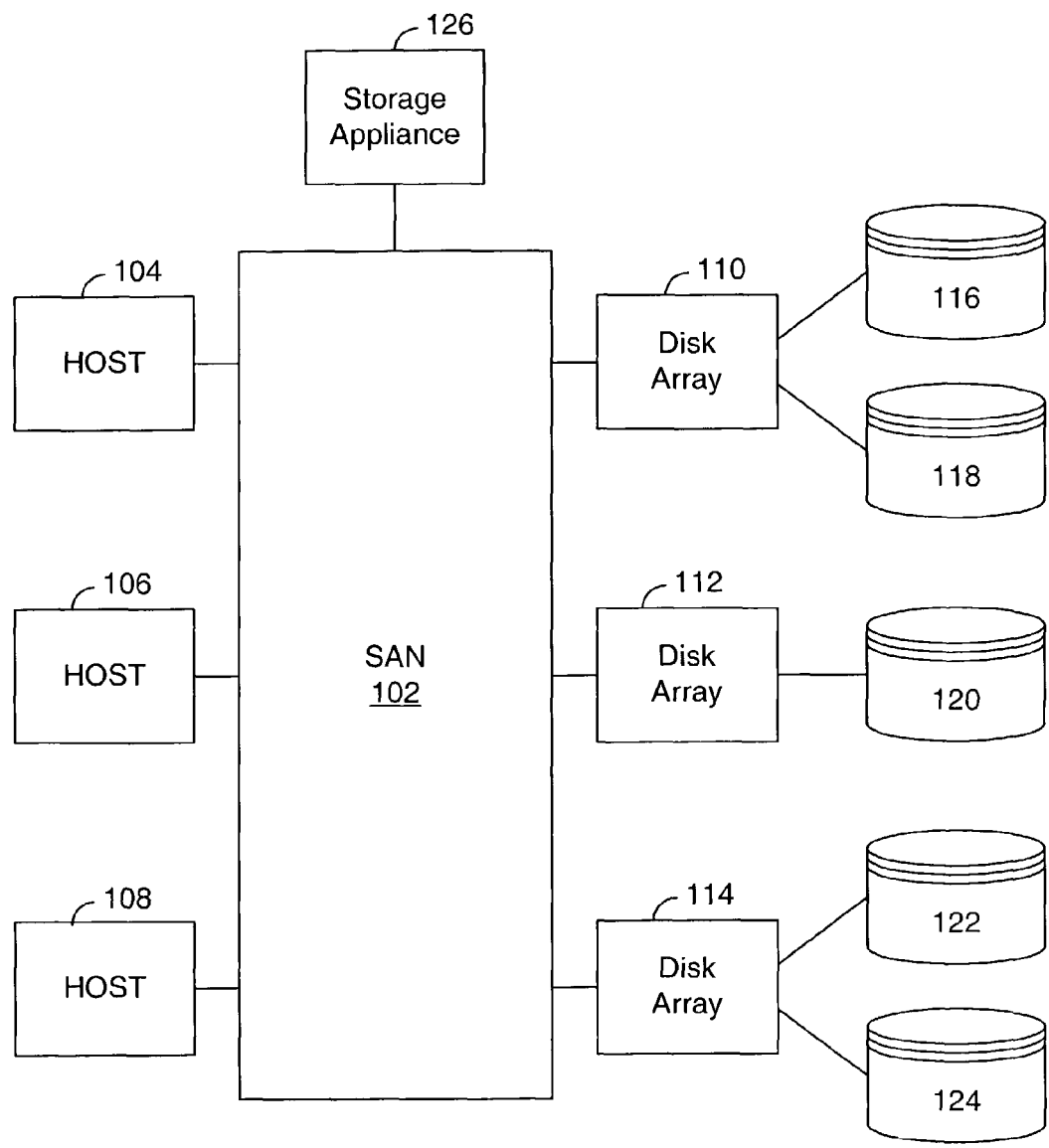
FIG. 1A is a block diagram illustrating an exemplary conventional storage area network.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In accordance with various embodiments of the present invention, virtualization of storage within a storage area network may be implemented within one or more network devices, which will be referred to herein as virtualization switches. More specifically, a network device such as a virtualization switch, which will be described in further detail below with reference to FIG. 3A, intercepts a frame or packet and obtains information from the frame or packet (e.g., virtual address). The network device then ascertains a virtual-physical mapping from the obtained information. For instance, the network device may use the obtained information as a "key" into a virtual to physical mapping table or algorithm to decide how to modify the frame or packet and/or whether to generate additional frames or packets.

A new or modified frame or packet may then be composed with information obtained from the virtual-physical mapping. The new or modified frame or packet is then sent to the intended recipient of the intercepted frame or packet. For instance, one or more frames or packets may be generated and transmitted to one or more physical addresses corresponding to the virtual address specified in the intercepted frame or packet. Thus, embodiments of the invention may be applied to a packet or frame, as will be described in further detail below. For convenience, the subsequent discussion will describe embodiments of the invention with respect to frames. Switches act on frames and use information about SANs to make switching decisions.

Note that the frames being received and transmitted by a virtualization switch possess the frame format specified for a standard protocol such as Ethernet or fibre channel. Hence, software and hardware conventionally used to generate such frames may be employed with this invention. Additional hardware and/or software is employed to modify and/or generate frames compatible with the standard protocol in accordance with this invention. Those of skill in the art will understand how to develop the necessary hardware and software to allow virtualization as described below.

The frame is generated by a network device such as a host, switch, or storage device. Obviously, the appropriate network devices should be configured with the appropriate software and/or hardware for performing virtualization functionality. Of course, all network devices within the storage area network need not be configured with the virtualization functionality. Rather, selected switches and/or ports may be configured with or adapted for virtualization functionality. Similarly, in various embodiments, such virtualization functionality may be enabled or disabled through the selection of various modes. Moreover, it may be desirable to configure selected ports of network devices as virtualization-capable ports capable of performing virtualization, either continuously, or only when in a virtualization enabled state.

The standard protocol employed in the storage area network (i.e., the protocol used to frame the data) will typically, although not necessarily, be synonymous with the "type of traffic" carried by the network. As explained below, the type of traffic is defined in some encapsulation formats. Examples of the type of traffic are typically layer 2 or corresponding layer formats such as Ethernet, Fibre Channel, and Infini-Band.

Figure 1B:
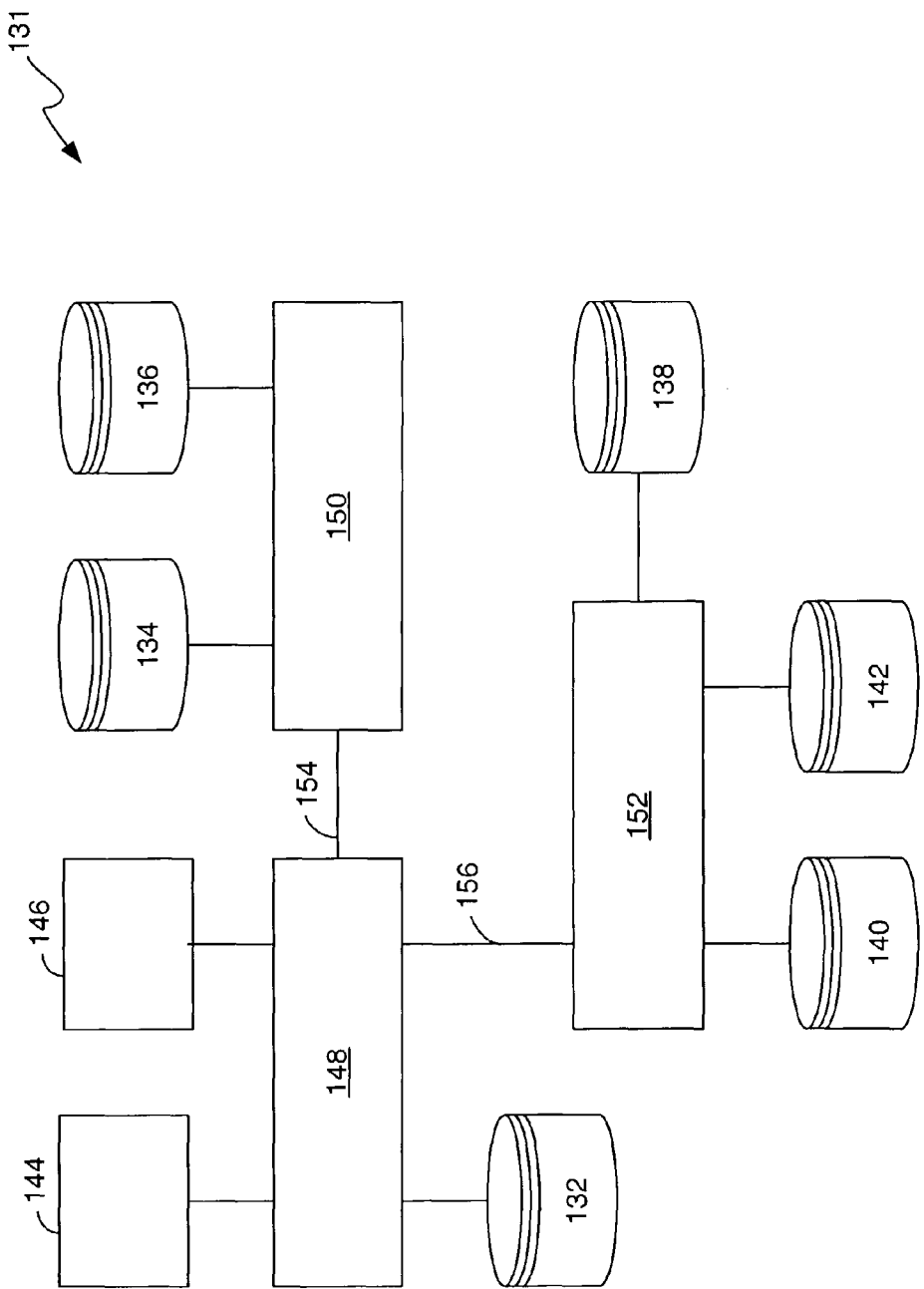
FIG. 1B is a block diagram illustrating a storage area network capable of implementing various embodiments of prior art virtualization functions.

As described above, a storage area network (SAN) is a network that interconnects different data storage devices with associated network hosts (e.g., data servers or end user machines) on behalf of a larger network of users. A SAN is defined by the physical configuration of the system. In other words, those devices in a SAN must be physically interconnected. Within a storage area network 131 such as that illustrated in FIG. 1B, various storage devices 132, 134, 136, 138, 140, and 142 may be implemented, which may be homogeneous (e.g., identical device types, sizes, or configurations) as well as heterogeneous (e.g., different device types, sizes or configurations). Data may be read from, as well as written to, various portions of the storage devices 132-142 in response to commands sent by hosts 144 and 146. Communication among the storage devices and hosts is accomplished by coupling the storage devices and hosts together via one or more switches, routers, or other network nodes configured to perform a switching function. In this example, switches 148, 150, and 152 communicate with one another via interswitch links 154 and 156.

As indicated above, this invention pertains to "virtualization" in storage networks. Unlike prior methods, virtualization in this invention is implemented on the switches or other "interior" network nodes of a storage area network. Preferably, multiple switches making up a network fabric will together implement the virtualization model of a given storage area network. Further, the virtualization of this invention typically is implemented on a per port basis. In other words, a multi-port switch will have virtualization separately implemented on two or more of its ports. Individual ports have dedicated logic for handing the virtualization functions for packets or frames handled by the individual ports. This allows virtualization processing to scale with the number of ports, and provides far greater bandwidth for virtualization than can be provided with host based or storage based virtualization schemes. In such prior art approaches the number of connections between hosts and the network fabric or between storage nodes and the network fabric are limited—at least in comparison to the number of ports in the network fabric.

In a specific and preferred embodiment of the invention, the virtualization logic is separately implemented at individual ports of a given switch—rather than having centralized processing for all ports of a switch. This allows the virtualization processing capacity to be closely matched with the exact needs of the switch on a per port basis. If a central processor is employed for the entire switch (serving numerous ports), the processor must be designed/selected to handle maximum traffic at all ports. For many applications, this represents extremely high processing requirements and a very large/expensive processor. If the central processor is too small, the switch will at times be unable to keep up with the switching/virtualization demands of the network.

Virtualization may take many forms. In general, it may be defined as logic or procedures that inter-relate physical storage and virtual storage on a storage network. Hosts see a representation of available physical storage that is not constrained by the physical arrangements or allocations inherent in that storage. One example of a physical constraint that is transcended by virtualization includes the size and location of constituent physical storage blocks. For example, logical units as defined by the Small Computer System Interface (SCSI) standards come in precise physical sizes (e.g., 36 GB and 72 GB Virtualization can represent storage in virtual logical units that are smaller or larger than the defined size of a physical logical unit. Further, virtualization can present a virtual logical unit comprised of regions from two or more different physical logical units, sometimes provided on devices from different vendors. Preferably, the virtualization operations are transparent to at least some network entities (e.g., hosts).

In some general ways, virtualization on a storage area network is similar to virtual memory on a typical computer system. Virtualization on a network, however, brings far greater complexity and far greater flexibility. The complexity arises directly from the fact that there are a number of separately interconnected network nodes. Virtualization must span these nodes. The nodes include hosts, storage subsystems, and switches (or comparable network traffic control devices such as routers). Often the hosts and/or storage subsystems are heterogeneous, being provided by different vendors. The vendors may employ distinctly different protocols (standard protocols or proprietary protocols). Thus, in many cases, virtualization provides the ability to connect heterogeneous initiators (e.g., hosts or servers) to a distributed, heterogeneous set of targets (storage subsystems), enabling the dynamic and transparent allocation of storage.

Examples of network specific virtualization operations include the following: RAID 0 through RAID 5, concatenation of memory from two or more distinct logical units of physical memory, sparing (auto-replacement of failed physical media), remote mirroring of physical memory, logging information (e.g., errors and/or statistics), load balancing among multiple physical memory systems, striping (e.g., RAID 0), security measures such as access control algorithms for accessing physical memory, resizing of virtual memory blocks, Logical Unit (LUN) mapping to allow arbitrary LUNs to serve as boot devices, backup of physical memory (point in time copying), and the like. These are merely examples of virtualization functions. This invention is not limited to this full set or any particular subset thereof.

In much of the discussion herein, the functions of virtualization switches of this invention are described in terms of the SCSI protocol. This is because many storage area networks in commerce run a SCSI protocol to access storage sites. Frequently, the storage area network employs fibre channel (FC-PH (ANSI X3.230-1994, Fibre Channel-Physical and Signaling Interface) as a lower level protocol and runs IP and SCSI on top of fibre channel. Note that the invention is not limited to any of these protocols. For example, fibre channel may be replaced with Ethernet, Infiniband, and the like. Further the higher level protocols need not include SCSI. For example, other protocols may be used by hosts to access storage. In addition, it is important to note that SCSI will be used herein to refer to any implementation of SCSI over FC, iSCSI (SCSI over IP), parallel SCSI (SCSI over a parallel cable), serial SCSI (SCSI over serial cable), and to all the other incarnations of SCSI.

Because SCSI is so widely used in storage area networks, much of the terminology used herein will be SCSI terminology. The use of SCSI terminology (e.g., "initiator" and "target") does not imply that the describe procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a device that performs an operation requested by an initiator. For example, a target physical memory disk will obtain or write data as initially requested by a host initiator. Note that while the host initiator may provide instructions to read from or write to a "virtual" target having a virtual address, a switch of this invention must first convert those instructions to a physical target address before instructing the target.

Targets may be divided into physical or virtual "logical units." These are specific devices addressable through the target. For example, a physical storage subsystem may be organized in a number of distinct logical units. In this document, hosts view virtual memory as distinct virtual logical units. Sometimes herein, logical units will be referred to as "LUNs." In the SCSI standard, LUN refers to a logical unit number. But in common parlance, LUN also refers to the logical unit itself.

Central to virtualization is the concept of a "virtualization model." This is the way in which physical storage provided on storage subsystems (such as disk arrays) is related to a virtual storage seen by hosts or other initiators on a network. While the relationship may take many forms and be characterized by various terms, a SCSI-based terminology will be used, as indicated above. Thus, the physical side of the storage area network will be described as a physical LUN. The host side, in turn, sees one or more virtual LUNs, which are virtual representations of the physical LUNs. The mapping of physical LUNs to virtual LUNs may logically take place over one, two, or more levels. In the end, there is a mapping function that can be used by switches of this invention to interconvert between physical LUN addresses and virtual LUN addresses.

Figure 2:
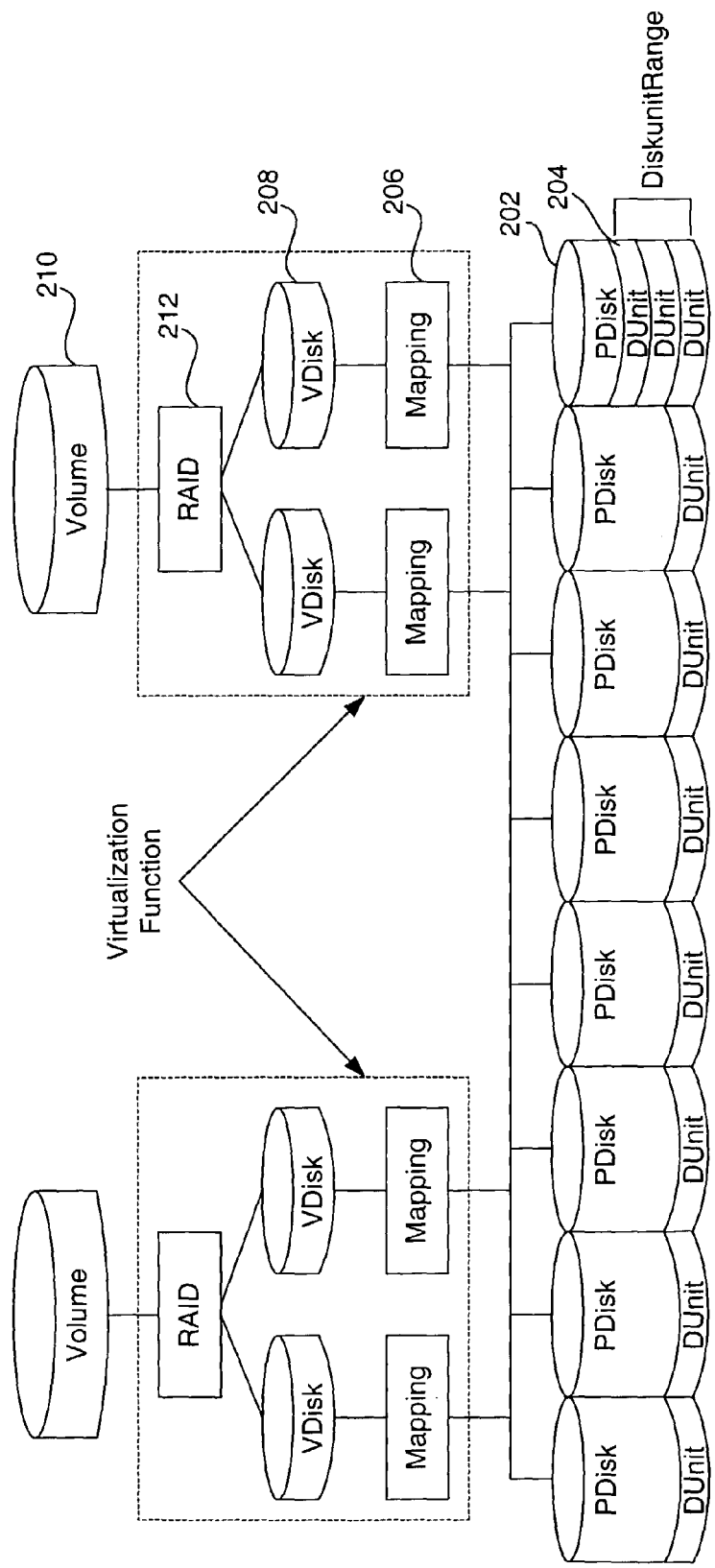
FIG. 2 is a block diagram illustrating a virtualization model that may be implemented in accordance with various embodiments of the invention.

FIG. 2 is a block diagram illustrating an example of a virtualization model that may be implemented within a storage area network in accordance with various embodiments of the invention. As shown, the physical storage of the storage area network is made up of one or more physical LUNs, shown here as physical disks 202. Each physical LUN is a device that is capable of containing data stored in one or more contiguous blocks which are individually and directly accessible. For instance, each block of memory within a physical LUN may be represented as a block 204, which may be referred to as a Disk Unit (Dunit).

Through a mapping function 206, it is possible to convert physical LUN addresses associated with physical LUNs 202 to virtual LUN addresses, and vice versa. More specifically, as described above, the virtualization and therefore the mapping function may take place over one or more levels. For instance, as shown, at a first virtualization level, one or more virtual LUNs 208 each represents one or more physical LUNs 202, or portions thereof. The physical LUNs 202 that together make up a single virtual LUN 208 need not be contiguous. Similarly, the physical LUNs 202 that are mapped to a virtual LUN 208 need not be located within a single target. Thus, through virtualization, virtual LUNs 208 may be created that represent physical memory located in physically distinct targets, which may be from different vendors, and therefore may support different protocols and types of traffic.

Although the virtualization model may be implemented with a single level, a hierarchical arrangement of any number of levels may be supported by various embodiments of the present invention. For instance, as shown, a second virtualization level within the virtualization model of FIG. 2 is referred to as a high-level VLUN or volume 210. Typically, the initiator device "sees" only VLUN 210 when accessing data.

In this example, VLUN 210 is implemented as a "logical" RAID array of virtual LUNs 208. Moreover, such a virtualization level may be further implemented, such as through the use of striping and/or mirroring. For instance, RAID 1+0 or RAID 0+1 operations may be performed consecutively, as will be described in further detail below with reference to FIGS. 10A through 10C. In addition, it is important to note that it is unnecessary to specify the number of virtualization levels to support the mapping function 206. Rather, an arbitrary number of levels of virtualization may be supported, for example, through a hierarchical mapping function. For instance, various levels of nodes may be built and maintained in a tree data structure, linked list, or other suitable data structure that can be traversed.

Each initiator may therefore access physical LUNs via nodes located at any of the levels of the hierarchical virtualization model. Nodes within a given virtualization level of the hierarchical model implemented within a given storage area network may be both visible to and accessible to an allowed set of initiators (not shown). Nodes within a particular virtualization level (e.g., VLUNs) need to be created before functions (e.g., read, write) may be operated upon them. This may be accomplished, for example, through a master boot record of a particular initiator. In addition, various initiators may be assigned read and/or write privileges with respect to particular nodes (e.g., VLUNs) within a particular virtualization level. In this manner, a node within a particular virtualization level may be both visible to and accessible by selected initiators.

Figure 3A:
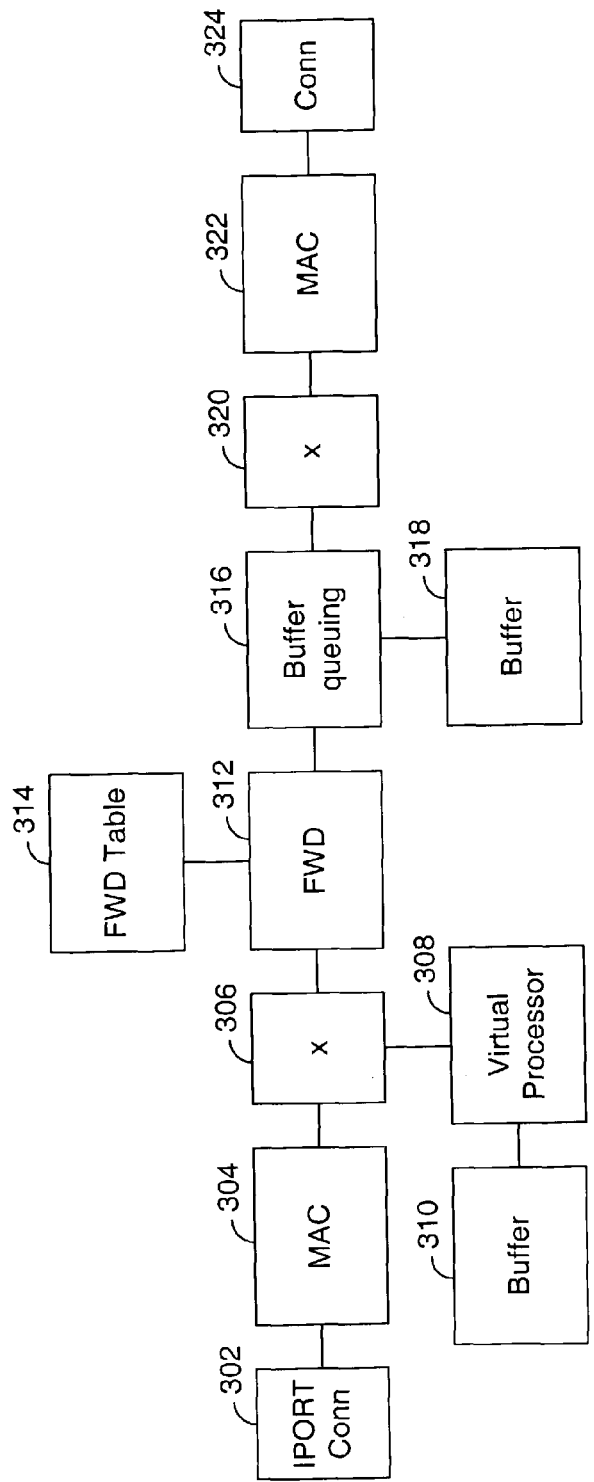
FIG. 3A is a block diagram illustrating an exemplary virtualization switch in which various embodiments of the present invention may be implemented.

As described above, various switches within a storage area network may be virtualization switches supporting virtualization functionality. FIG. 3A is a block diagram illustrating an exemplary virtualization switch in which various embodiments of the present invention may be implemented. As shown, data is received by an intelligent, virtualization port via a bi-directional connector 302. In association with the incoming port, Media Access Control (MAC) block 304 is provided, which enables frames of various protocols such as Ethernet or fibre channel to be received. In addition, a virtualization intercept switch 306 determines whether an address specified in an incoming frame pertains to access of a virtual storage location of a virtual storage unit representing one or more physical storage locations on one or more physical storage units of the storage area network.

When the virtualization intercept switch 306 determines that the address specified in an incoming frame pertains to access of a virtual storage location rather than a physical storage location, the frame is processed by a virtualization processor 308 capable of performing a mapping function such as that described above. More particularly, the virtualization processor 308 obtains a virtual-physical mapping between the one or more physical storage locations and the virtual storage location. In this manner, the virtualization processor 308 may look up either a physical or virtual address, as appropriate. For instance, it may be necessary to perform a mapping from a physical address to a virtual address or, alternatively, from a virtual address to one or more physical addresses.

Once the virtual-physical mapping is obtained, the virtualization processor 308 may then employ the obtained mapping to either generate a new frame or modify the existing frame, thereby enabling the frame to be sent to an initiator or a target specified by the virtual-physical mapping. For instance, a frame may be replicated multiple times in the case of a mirrored write. This replication requirement may be specified by a virtual-physical mapping function. In addition, the source address and/or destination addresses are modified as appropriate. For instance, for data from the target, the virtualization processor replaces the source address, which was originally the physical LUN address with the corresponding virtual LUN and address. In the destination address, the port replaces its own address with that of the initiator. For data from the initiator, the port changes the source address from the initiator's address to the port's own address. It also changes the destination address from the virtual LUN/address to the corresponding physical LUN/address. The new or modified frame may then be provided to the virtualization intercept switch 306 to enable the frame to be sent to its intended destination.

While the virtualization processor 308 obtains and applies the virtual-physical mapping, the frame or associated data may be stored in a temporary memory location (e.g., buffer) 310. In addition, it may be necessary or desirable to store data that is being transmitted or received until it has been confirmed that the desired read or write operation has been successfully completed. As one example, it may be desirable to write a large amount of data to a virtual LUN, which must be transmitted separately in multiple frames. It may therefore be desirable to temporarily buffer the data until confirmation of receipt of the data is received. As another example, it may be desirable to read a large amount of data from a virtual LUN, which may be received separately in multiple frames. Furthermore, this data may be received in an order that is inconsistent with the order in which the data should be transmitted to the initiator of the read command. In this instance, it may be beneficial to buffer the data prior to transmitting the data to the initiator to enable the data to be re-ordered prior to transmission. Similarly, it may be desirable to buffer the data in the event that it is becomes necessary to verify the integrity of the data that has been sent to an initiator (or target).

The new or modified frame is then received by a forwarding engine 312, which obtains information from various fields of the frame, such as source address and destination address. The forwarding engine 312 then accesses a forwarding table 314 to determine whether the source address has access to the specified destination address. More specifically, the forwarding table 314 may include physical LUN addresses as well as virtual LUN addresses. The forwarding engine 312 also determines the appropriate port of the switch via which to send the frame, and generates an appropriate routing tag for the frame.

Once the frame is appropriately formatted for transmission, the frame will be received by a buffer queuing block 316 prior to transmission. Rather than transmitting frames as they are received, it may be desirable to temporarily store the frame in a buffer or queue 318. For instance, it may be desirable to temporarily store a packet based upon Quality of Service in one of a set of queues that each correspond to different priority levels. The frame is then transmitted via switch fabric 320 to the appropriate port. As shown, the outgoing port has its own MAC block 322 and bi-directional connector 324 via which the frame may be transmitted.

Figure 3B:
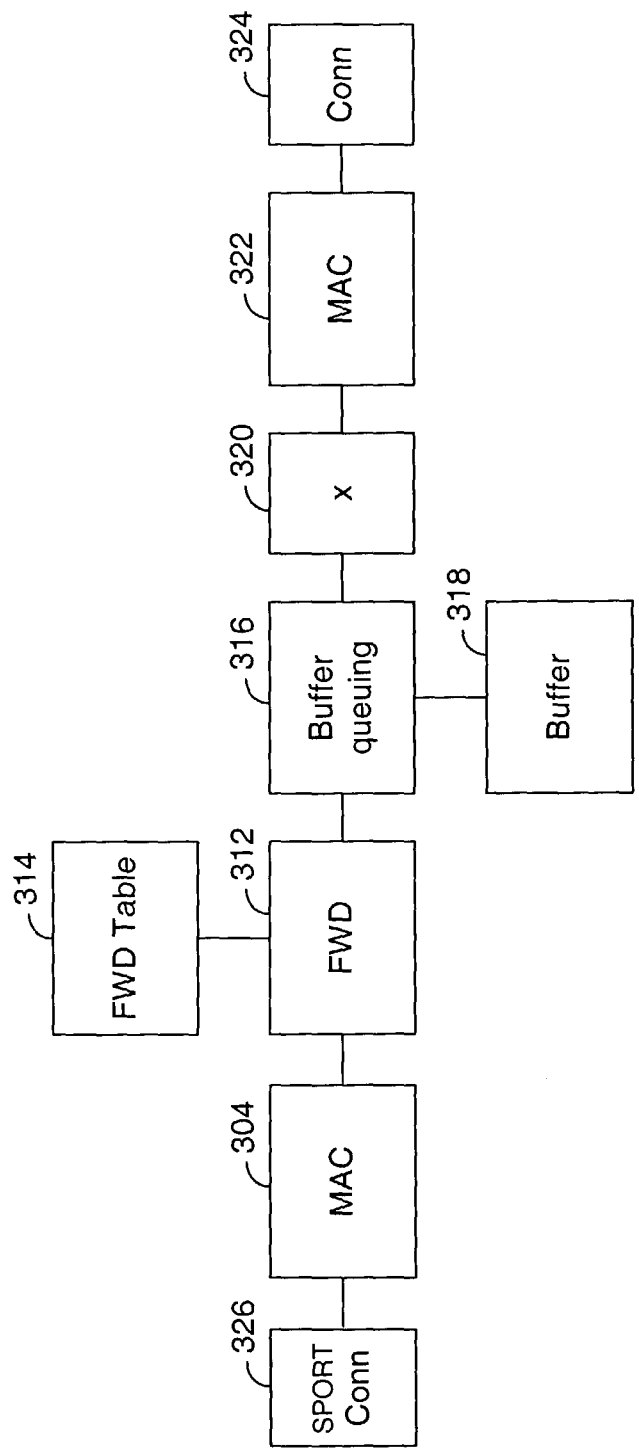
FIG. 3B is a block diagram illustrating an exemplary standard switch in which various embodiments of the present invention may be implemented.

As described above, all switches in a storage area network need not be virtualization switches. In other words, a switch may be a standard switch in which none of the ports implement "intelligent," virtualization functionality. FIG. 3B is a block diagram illustrating an exemplary standard switch in which various embodiments of the present invention may be implemented. As shown, a standard port 326 has a MAC block 304. However, a virtualization intercept switch and virtualization processor such as those illustrated in FIG. 3A are not implemented. A frame that is received at the incoming port is merely processed by the forwarding engine 312 and its associated forwarding table 314. Prior to transmission, a frame may be queued 316 in a buffer or queue 318. Frames are then forwarded via switch fabric 320 to an outgoing port. As shown, the outgoing port also has an associated MAC block 322 and bi-directional connector 324.

Exchange management will be described in further detail below with reference to FIG. 5-13B. Exchange management functionality is preferably implemented on a per-port basis, and therefore may be implemented in the virtual processor 308. Alternatively, exchange management functionality may be implemented in a separate exchange management processor (not shown).

As described above, the present invention may be implemented, at least in part, by a virtualization switch. Virtualization is preferably performed on a per-port basis rather than per switch. Thus, each virtualization switch may have one or more virtualization ports that are capable of performing virtualization functions, as well as ports that are not capable of such virtualization functions. In one embodiment, the switch is a hybrid, with a combination of line cards as described above with reference to FIG. 3A and FIG. 3B.

Although the network devices described above with reference to FIG. 3A and 3B are described as switches, these network devices are merely illustrative. Thus, other network devices such as routers may be implemented to receive, process, modify and/or generate packets or frames with functionality such as that described above for transmission in a storage area network. Moreover, the above-described network devices are merely illustrative, and therefore other types of network devices may be implemented to perform the disclosed virtualization functionality.

Figure 4:
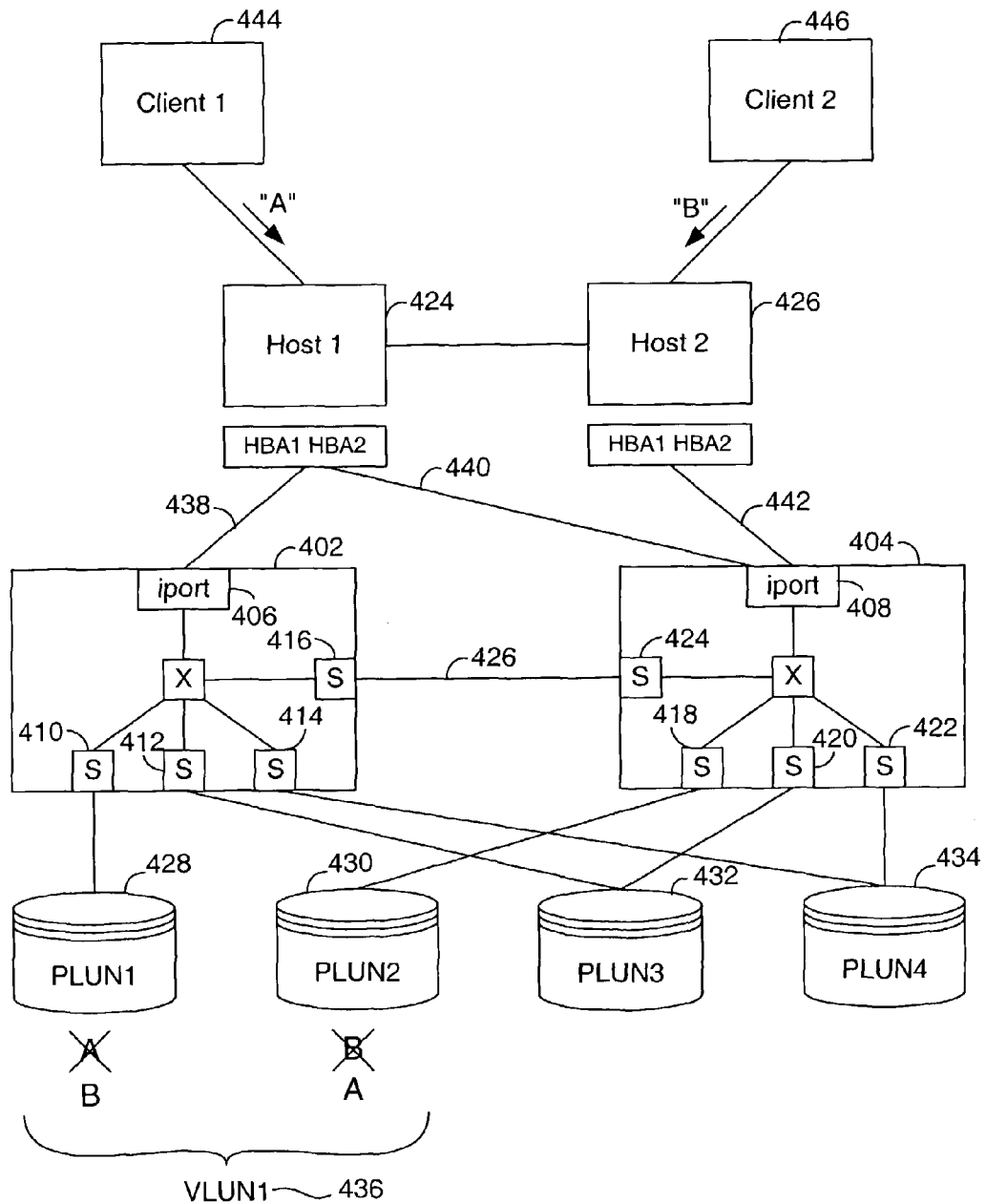
FIG. 4 is a block diagram illustrating an exemplary system architecture in which various embodiments of the invention may be implemented.

As described above, a storage area network may be implemented with virtualization switches adapted for implementing virtualization functionality (and exchange management functionality) as well as standard switches. FIG. 4 is a block diagram illustrating an exemplary system architecture in which various embodiments of the invention may be implemented. In this example, two virtualization switches 402 and 404 are implemented to support transmission of frames within the storage area network. Each virtualization switch may include one or more "intelligent" virtualization ports as well as one or more standard ports. More specifically, the virtualization switches 402 and 404 in this example each have a virtualization port 406 and 408, respectively. In addition, each of the virtualization switches 402 and 404 has multiple standard ports 410, 412, 414, 416 and 418, 420, 422, 424, respectively. In order to support the virtual-physical mapping and accessibility of memory by multiple applications and/or hosts, it is desirable to coordinate memory accesses between the virtualization switches 402 and 404. Communication between the switches 402 and 404 may be accomplished by an inter-switch link 426 between two switches. As shown, the inter-switch link 426 may be between two standard ports. In other words, synchronization of memory accesses by two switches merely requires communication between the switches. This communication may be performed via intelligent virtualization ports, but need not be performed via a virtualization port or between two virtualization ports.

Virtualization of storage is performed for a variety of reasons, such as mirroring. For example, consider four physical LUNs, PLUN1 428, PLUN2 430, PLUN3 432, and PLUN4 434. It is often desirable to group two physical LUNs for the purpose of redundancy. Thus, as shown, two physical LUNs, PLUN1 428 and PLUN2 430 are represented by a single virtual LUN, VLUN1 436. When data is mirrored, the data is mirrored (e.g., stored) in multiple physical LUNs to enable the data to be retrieved upon failure of one of the physical LUNs.

Various problems may occur when data is written to or read from one of a set of "mirrors." For instance, multiple applications 438, 440, running on the same or different hosts, may simultaneously access the same data or memory location (e.g., disk location or disk block). Similarly, commands such as read or write commands sent from two different hosts, shown at 438, 440 and 442 may be sent in the same time frame. Each host may have corresponding Host Bus Adapters (HBA) as shown. Ideally, the data that is accessed or stored by the applications or hosts should leave the mirrors intact. More particularly, even after a write operation to one of the mirrors, the data stored in all of the mirrors will remain consistent. In other words, the mirrors should continue to serve as redundant physical LUNs for the other mirrors in the event that one of the mirrors should fail.

In conventional systems in which mirroring is enabled, a relatively simultaneous access by two different sources often results in an inherent race condition. For instance, consider the situation when two different clients send a write command to the same virtual LUN. As shown, client 1 444 sends a write command with the data "A," while client 2 446 sends a write command with the data "B." If the first client 444 sends data "A" to VLUN1 436 first, the data "A" may be written, for example, to PLUN1 428. However, before it can be mirrored to PLUN2 430, the second client 446 may send data "B." Data "B" may be written to PLUN2 430 prior to being mirrored to PLUN1 428. Data "A" is then mirrored to PLUN2 430. Similarly, data "B" is mirrored to PLUN1 428. Thus, as shown, the last write operation controls the data to be stored in a particular physical LUN. In this example, upon completion of both mirror operations, PLUN1 428 stores data "B" while PLUN2

430 stores data "A." Thus, the two physical LUNs no longer mirror one another, resulting in ambiguous data.

In order to solve the inherent race condition present in conventional systems, the virtualization ports communicate with one another, as described above, via an inter-switch link such as 426. In other words, the ports synchronize their access of virtual LUNs with one another. This is accomplished, in one embodiment, through the establishment of a single master virtualization port that is known to the other virtualization ports as the master port. The identity of the master port may be established through a variety of mechanisms. As one example, the master port may send out a multicast message to the other virtualization ports indicating that it is the master virtualization port. As another example, the virtualization ports may be initialized with the identity of the master port. In addition, in the event of failure of the master virtualization port, it may be desirable to enable one of the slave virtualization ports to substitute as a master port.

Prior to accessing a virtual LUN, a slave virtualization port initiates a conversation with the master virtualization port to request permission to access the virtual LUN. This is accomplished through a locking mechanism that locks access to the virtual LUN until the lock is released. For instance, the slave virtualization port (e.g., port 406) may request the grant of a lock from the master virtualization port (e.g., port 408). The master virtualization port then informs the slave virtualization port when the lock is granted. When the lock is granted, access to the corresponding physical storage locations is "locked" until the lock is released. In other words, the holder of the lock has exclusive read and/or write access to the data stored in those physical locations. In this example, data "A" is then stored in both physical LUN1 428 and physical LUN2 430. When the slave virtualization port 406 receives a STATUS OK message indicating that the write operation to the virtual LUN was successful, the lock may be released. The master virtualization port 408 may then obtain a lock to access of the virtual LUN until data "B" is stored in both mirrors of the VLUN1 436. In this manner, virtualization ports synchronize access to virtual LUNs to ensure integrity of the data stored in the underlying physical storage mediums.

Normally, in SCSI protocols for memory access, the commands are sent by initiators and targets to effect a read or write operation. To request read or write access to a target, the initiator sends a request command (CMD). More specifically, the command requests access to a particular memory location in the target. To this end, the request command contains the following information: SCSI LUN, the starting memory address for data to be accessed within the logical unit (an offset from the beginning address of the logical unit), the length of the memory access (e.g., in blocks or bytes), and type of command (read or write). Upon receiving the request command, the target device (typically via a memory controller) determines whether the requested memory location can be accessed. If so and the access is a write operation, the target replies to the initiator with a transfer ready signal (XFR_RDY), which also indicates the amount of data that can be transferred. Thereafter the initiator sends one or more frames of data to the target. The controller of the target attempts to write the incoming data to the specified memory location(s). Upon command completion (successful or unsuccessful), the target returns a status byte to the initiator. Since most error and exception conditions cannot be adequately described with a single status byte, one status code, CHECK CONDITION, indicates that additional information is available. Assuming that the write operation is a success, then the target replies with a STATUS OK signal. To end the operation, the target sends a COMMAND COMPLETE message to the initiator. The SCSI write operation is then complete.

If the request command specifies a read operation, then the target directly replies with data that has been read from the requested location. A transfer ready signal is not required. When all requested data has been sent, the target replies with a STATUS OK and COMMAND COMPLETE signals.

In accordance with this invention, virtualization switches are interposed between targets and initiators (usually storage subsystems and hosts). Virtualization ports on these switches intercept SCSI commands and take certain actions before notifying the initiator or target, as the case may be. FIGS. 12A-13B, described below, show various scenarios by which the virtualization switches handle SCSI commands while performing exchange management.

Generally, in the case of request commands (read or write), the virtualization port takes three actions. First, it converts the virtual LUN and associated address and length of the request to its corresponding physical LUN and associated address and length. Of course, in the case of mirroring and striping, the result of this conversion from a virtual LUN, address and length may produce multiple corresponding sets of physical LUN, address, and length. This may be accomplished by consulting an internal table or list of mappings between virtual and physical locations. Of course, other suitable data structures such as lists and trees may also be used. In addition, it is also possible to compute a virtual-physical mapping using an algorithm (for example, in the case of striping). Note that a single virtual block of data may correspond to two or more physical blocks of data—spanning multiple LUNs. In such case, the virtualization port must recognize that the physical mapping specifies two separate physical locations.

Second, after the physical LUNs, addresses, and lengths have been identified by the virtualization port, the port must then ensure that no other node will concurrently try to access the same data location. So, in accordance with one embodiment, the virtualization requests that the physical data location be locked until the access is completed. This may be accomplished by submitting a lock request to a master virtualization port—unless the requesting port is itself a master.

Third, after the lock is granted, the virtualization port prepares one or more new (replacement) SCSI request commands. These commands include the physical location (or locations) corresponding to the virtual locations specified in the intercepted request command from the initiator. The commands also include the virtualization port address as the source address. That way, the reply from the target comes back to the virtualization port, rather than the host. For example, if a virtualization port receives a transfer ready (XFR_RDY) command from the target, it may send a corresponding transfer ready command back to the initiator. However, a LUN field (that contains either the VLUN or the PLUM) is typically not present in a transfer ready command or in data that is transferred. Such a LUN field is present only in a SCSI command. Rather, in one embodiment, the intelligent port is able to correlate the transfer ready and the data with the SCSI command using other fields in the Fibre Channel frame.

In some cases, the virtualization port will receive multiple transfer ready commands for a single read/write request. This is typically the case when the virtual memory location maps to multiple distinct physical LUNs. In that case, each physical LUN will reply with a transfer ready command in response to the read/write request commands sent by the virtualization port. Thus, the virtualization port should be able to send the initiator only a single transfer ready command when the initiator sends only a single request command—regardless of how many physical LUNs are implicated in the request. Virtualization ports treat status commands just as they treat transfer ready commands.

With respect to actual data transfers between the initiators and targets, the virtualization switch simply intercepts the data frames and replaces the source and destination addresses as appropriate. For data from the target, the port replaces the source address, which was originally the physical LUN address with the corresponding virtual LUN and address. In the destination address, the port replaces its own address with that of the initiator. For data from the initiator, the port changes the source address from the initiator's address to the port's own address. It also changes the destination address from the virtual LUN/address to the corresponding physical LUN/address. There are also cases in which this processing is more complex. For example, in one embodiment, in the case of mirroring or striping, the status is not simply be rewritten and sent do the initiator. Rather, all the status' for all the commands sent toward the PLUNs are collected. If all the status' are SUCCESS, a status of SUCCESS is returned to the initiator.

As described above, since a virtualization switch composes and modifies frames according to a virtual-physical mapping, it communicates with both the host and the PLUNs that are being accessed. Thus, upon receipt of a frame from the host or one of the PLUNs, or upon the sending of a frame to the host or one of the PLUNs, it is preferable if these communications are managed and maintained by the virtualization switch. Accordingly, the present invention enables these different communications associated with an access of a virtual storage location to managed and linked.

In accordance with one embodiment, the present invention is implemented in a Fibre Channel network. Fibre Channel defines several types of ports. Any port on a node device, such as a disk or PC is an N_Port, as compared with a port on a Fabric, which is an F_Port. The highest level Fibre Channel mechanism used for communication between N_Ports is an exchange, which may be bidirectional or unidirectional. The N_Port that originated an exchange is typically referred to as the originator of the exchange, while the N_Port to which an exchange originator wishes to communicate is referred to as a responder. Exchanges are composed of one or more related sequences. A sequence is a group of related frames transmitted unidirectionally from one N_Port to another. Although the use of the Fibre Channel terminology will be used below, the present invention may also be used to manage exchanges (i.e., unidirectional or bidirectional communication between two ports) in other protocols and communication mediums.

In accordance with various embodiments of the invention, virtualization functionality is performed by a switch rather than on a storage device, storage appliance, or host. Since the switch intercepts frames between the host and various targets, exchange management is also performed by the virtualization switch. More specifically, the exchange management is preferably performed on a per-port basis. In other words, in accordance with a preferred embodiment, the exchange management is performed by logic dedicated to a port of a network device such as a virtualization switch described above with reference to FIG. 3A.

Figure 5:
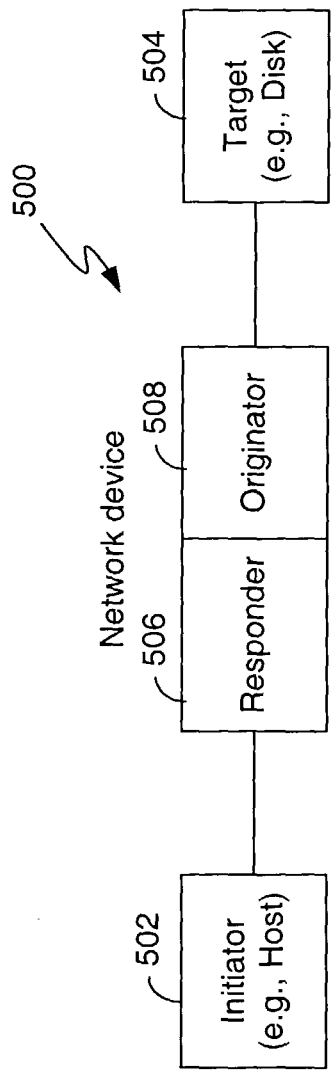
FIG. 5 is a diagram illustrating the use of a network device to perform exchange management in accordance with various embodiments of the invention.

FIG. 5 is a diagram illustrating the use of a network device 500 to perform exchange management in accordance with various embodiments of the invention. As described above, a host may attempt to access a virtual storage location of a virtual storage unit representing one or more physical storage locations on one or more physical storage units (i.e., targets) of the storage area network. Since the network device intercepts frames sent between an initiator 502 (e.g., host) and one or more targets 504 (e.g., disk), where at least one of these frames pertains to access of a virtual storage location, at least two different exchanges are performed to enable this communication. More specifically, a first host-side exchange is between the host 502, which initiates the first exchange as originator, and the network device, which acts as the responder 506 for the first exchange. Thus, the network device 500 may receive one or more frames from the initiator 502 as well as send one or more frames to the initiator 502 in the first exchange.

The network may initiate one or more additional disk-side exchanges in response to the first host-side exchange. When the network device sends new or modified frames from the network device to one of the targets 504, it initiates a second disk-side exchange in response to the first host-side exchange. Thus, the second exchange is between the network device 508 as originator of the second exchange and the target 504 as the responder for the second exchange. In this second exchange, the network device 508 may send one or more frames from the network device to a target 504 as well as receive one or more frames from the target 504. Although a single target is illustrated in FIG. 5, the target is one of the physical storage units that correspond to the virtual storage location being accessed during a READ or WRITE command. Thus, depending upon the virtualization employed within the SAN, multiple exchanges may be maintained between the network device originator 508 and multiple targets 504 (not shown to simplify illustration).

In order to manage both exchanges within the network device, exchange information is maintained and updated for both exchanges. More specifically, the exchange information is updated as appropriate for each frame received or sent within a sequence of either exchange. In order to update the exchange information, information from a received or sent frame in an exchange is stored and associated with that exchange. The exchange information for the host-side exchange is also preferably linked to the associated disk-side exchange(s), as will be described in further detail below.

Figure 6:
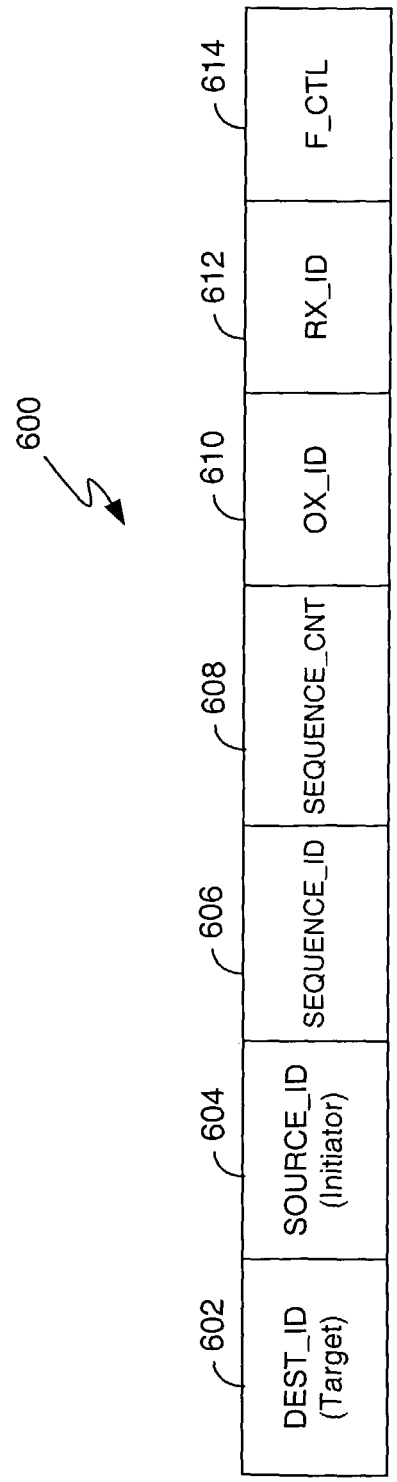
FIG. 6 is a diagram illustrating a Fibre Channel frame.

As described above, in accordance with one embodiment, exchange management is performed within a Fibre Channel network. In order to illustrate the types of information that is maintained for each exchange, it is useful to describe relevant fields of a Fibre Channel frame. FIG. 6 is a diagram illustrating a Fibre Channel frame and select fields that may be used in the present invention. A Fibre Channel frame 600 includes a Destination identifier (D_ID) 602. The D_ID 602 is a 3-byte field in the frame header used to indicate the address identifier of the N_Port the frame is to be delivered to. The Source identifier (S_ID) 604 is a 3-byte field in the frame header used to indicate the address identifier of the N_Port the frame was sent from. A Sequence Identifier (SEQ_ID) 606 is a Sequence Identifier. The SEQ_ID 606 is a 1-byte field in the frame header used to identify which sequence of an exchange a particular frame belongs to. In addition, a Sequence Counter (SEQ_CNT) 608 indicates a number of frames in a particular sequence of the corresponding exchange. An Originator Exchange Identifier (OX_ID) 610 is a 2-byte field in the frame header used by the originator of an exchange to identify frames as being part of a particular exchange. A Responder Exchange Identifier (RX_ID) 612 is a 2-byte field in the frame header used by the responder of the exchange to identify frames as being part of a particular exchange. Frame Control (F_CTL) 614 is a 24-bit field (3 byte field) that is used to indicate how a frame is to be processed and parsed. More specifically, each bit serves as a flag to indicate various states of the frame. For instance, the F_CTL 614 may indicate whether the frame is the last frame in a sequence as well as whether the frame is the first frame in a sequence.

In accordance with various embodiments of the invention, the network device (e.g., virtualization port) determines whether a host has access to a particular virtual storage location prior to obtaining a virtual-physical mapping and initiating a second exchange between the virtualization port and a target. FIG. 7 is a diagram illustrating an exemplary VLUN access configuration table that may be used to determine whether a host has access to a particular virtual storage location. As shown, the VLUN access configuration table 700 includes multiple entries. Each entry includes a Source Identifier (S_JD) 702, Destination Identifier (D_ID) 704, VLUN 706 being accessed, and virtual storage area network (VSAN) 708 including the VLUN 706. More specifically, within a SAN, it is possible to create different virtual SANs (VSANs). One method of implementing virtual storage area networks (VSANs) within a single storage area network is described in further detail with reference to U.S. patent application Ser. No. 10/034,160, Attorney Docket No. ANDIP001, entitled "Methods and Apparatus for Encapsulating a Frame for Transmission in a Storage Area Network," Edsall, et al., filed on Dec. 26, 2001, which is incorporated herein by reference for all purposes. Within each field of the table, the appropriate values are initialized. Of course, a wildcard "*" may be used to specify all possible values for the specified field (e.g., D_ID).

As described above, a first exchange (e.g., host-side exchange) and one or more additional exchanges (e.g., disk-side exchanges) are managed in accordance with various embodiments of the invention. FIG. 8 is a diagram illustrating a mechanism for linking exchange information in accordance with various embodiments of the invention. More specifically, for each host-side and associated disk-side exchange(s), exchange information is stored and updated as packets are sent and received by the network device (e.g., virtualization port). Various data structures and mechanisms may be used to "link" the exchange information for the first host-side exchange with the exchange information for associated disk-side exchange(s). In this example, a linked-list is used to link the exchange information for related exchanges. However, other suitable data structures such as a tree data structure may also be used to link these exchanges. Each exchange is identified by an exchange identifier.

In this example, the exchange information is stored and updated in a linked list 800. The exchange information 802 for the host-side exchange between the host and virtualization switch is linked via a pointer to exchange information 804 for a first disk-side exchange between the virtualization switch and a target. As described above, a host-side exchange may have one or more associated disk-side exchanges initiated by the virtualization switch. Thus, in this example, exchange information 806 for a second disk-side exchange between the virtualization switch and another target is stored and linked to the first host-side exchange 802. More specifically, in this example, disk-side exchange information for all disk-side exchanges 804, 806 are linked consecutively (e.g., directly and indirectly) to the host-side exchange 802 in a linked list. However, it is also possible to link the exchange information for each disk-side exchange directly to the exchange information for the host-side exchange that initiated the disk-side exchange, such as in a tree-data structure. In this manner, information for related exchanges may be obtained and deleted as appropriate through traversing the data structure that stores the exchange information.

Figure 9:
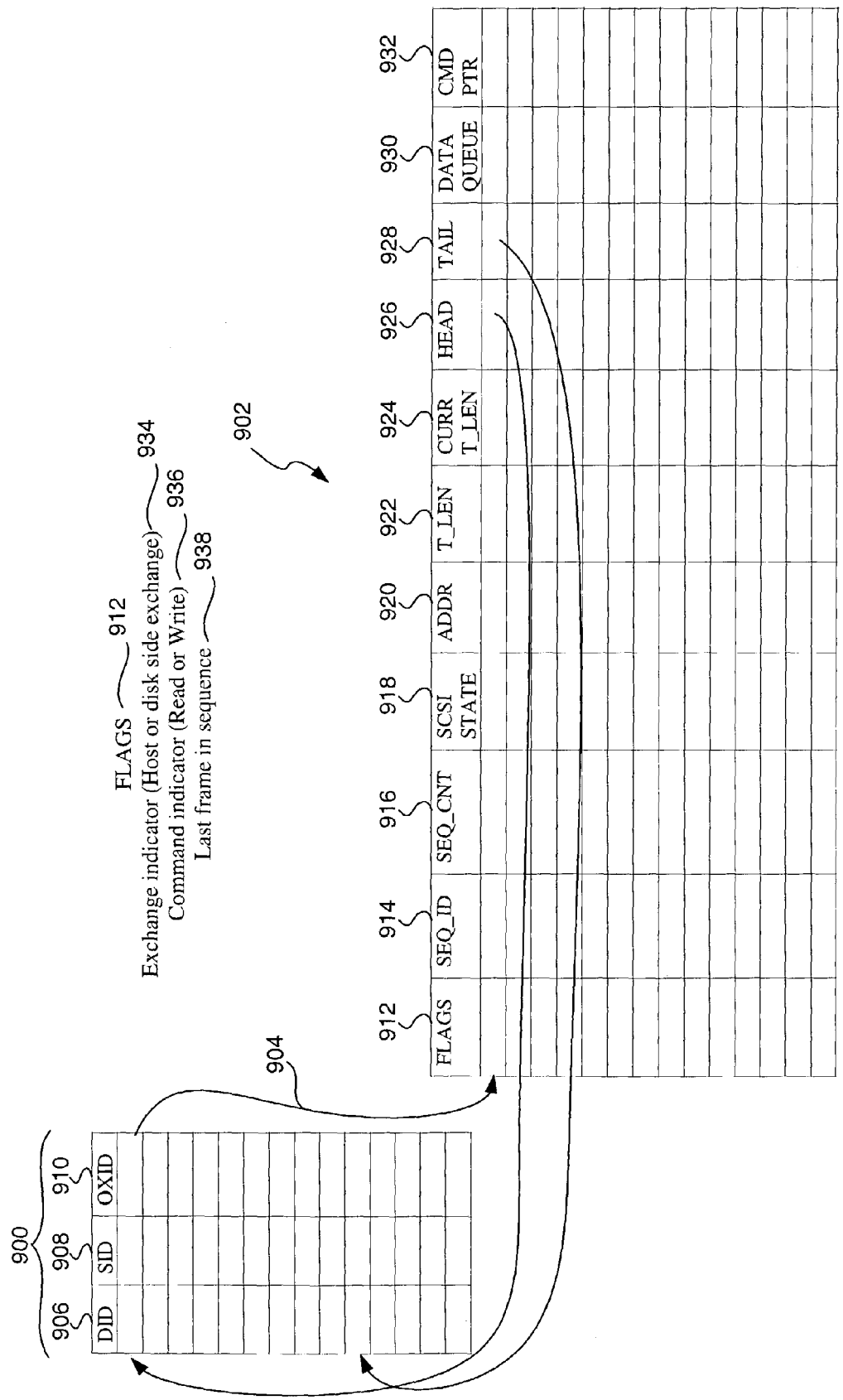
FIG. 9 is a diagram illustrating an exemplary exchange state table that may be used to link exchange information as shown in FIG. 8.

FIG. 9 is a diagram illustrating an exemplary exchange state table that may be used to link exchange information as shown in FIG. 8. As described above, each exchange is identified by an exchange identifier 900 (i.e., key). In accordance with one embodiment of the invention, each exchange identifier is a key to an exchange state table 902 that stores exchange information for each host-side exchange and disk-side exchange. More specifically, through obtaining the key 900, a link 904 to the appropriate entry in the exchange state table 902 may be obtained. The exchange identifier 900 that serves as the key to the exchange state table 902 includes a D_ID 906, S_ID 908, and OX_ID 910. In accordance with one embodiment, hardware updates and maintains the keys 900 while software updates and maintains the exchange state table 902. However, this example is merely illustrative and various combinations of hardware and software may be used to implement the disclosed embodiments.

Within the exchange state table 902, each entry may include a variety of exchange information. In this example, various flags 912 may be stored and updated. For instance, the flags 912 may be updated using information from the F_CTL field 614 of the frame header, described above with reference to FIG. 6. Examples of such flags will be described below.

In addition, sequence information for one or more sequences in the corresponding exchange may be stored and updated in the appropriate entry in the exchange state table 902. More specifically, a SEQ_ID 914 from one of the received or sent frames that identifies which sequence of the corresponding exchange the frame belongs to may be stored. In addition, a SEQ_CNT 916 from one of the received or sent frames that indicates a number of frames in the sequence may be stored.

A SCSI state 918 is also preferably stored and updated for the corresponding exchange as packets are received or sent. More specifically, the SCSI state 918 may be a CMD, DATA, or RESPONSE. Exemplary responses include XFR_RDY or STATUS. A CMD may be a READ or WRITE command.

When data is read in a READ command or written in a WRITE command, the address in memory where data is to be read from or written to is stored as ADDR 920. For instance, the address may be a logical block address. Transfer length (T_LEN) 922 indicates an amount of data to be transferred in the corresponding exchange, while current transfer length (CURR T_LEN) 924 indicates an amount of data that has already been transferred in the corresponding exchange.

As described above with reference to FIG. 8, the host-side exchange is "linked" to the associated one or more disk-side exchanges. This is accomplished, in one embodiment, through the use of a head pointer 926 that points to the head of the linked list and a tail pointer 928 that points to the tail of the linked list. The head pointer 926 points to the host-side exchange. As a new disk-side exchange is added to the linked list, the tail is updated to point to the newly added exchange information.

When data is received by the network device in a host-side exchange (e.g., in a WRITE operation), it preferably stores the data until it initiates a disk-side exchange to store the data in the appropriate PLUN. Similarly, when data is received by the network device in a disk-side exchange (e.g., in a READ operation), it may be stored until it is sent in the host-side exchange to the host. Thus, a data queue 930 may be maintained for each exchange so that data may be re-ordered as appropriate prior to transmission. In addition, a command 932 to be performed during the corresponding exchange may be stored. For instance, a command pointer may be used to point to the command and associated parameters. As described above, a command may be either a READ or WRITE command.

The flags 912 may include a variety of information. For instance, an exchange indicator 934 may indicate whether the exchange is a host-side exchange (i.e., between the host initiator and the network device) or a disk-side exchange (i.e., between the network device and a target). In addition, a command indicator 936 may indicate whether the corresponding exchange is associated with a read command or a write command. Similarly, the command indicator 936 may indicate whether both the host-side and disk-side exchange are associated with a read or write command. The exchange indicator 934 and command indicator 936 may be used, for instance, to determine when a host-side exchange includes a write command, and therefore data is to be sent in a disk-side exchange. As another example, when a disk-side exchange includes a read command, data is to be received from a disk and sent to the host. Accordingly, frames may be composed and sent in a disk-side exchange based on exchange information for the host-side exchange, and vice versa. The exchange information is continually updated when frames are sent (or received).

Other flags may also be implemented for various purposes and including a variety of information obtained from frames as well as indicating the state of a sequence or exchange. For instance, a frame indicator 938 may indicate whether the last frame received in the corresponding exchange is the last frame in the sequence. Other flags, indicators, and fields include, but are not limited to, a frame pointer that points to a current frame in an exchange and payload length.

Figure 10:
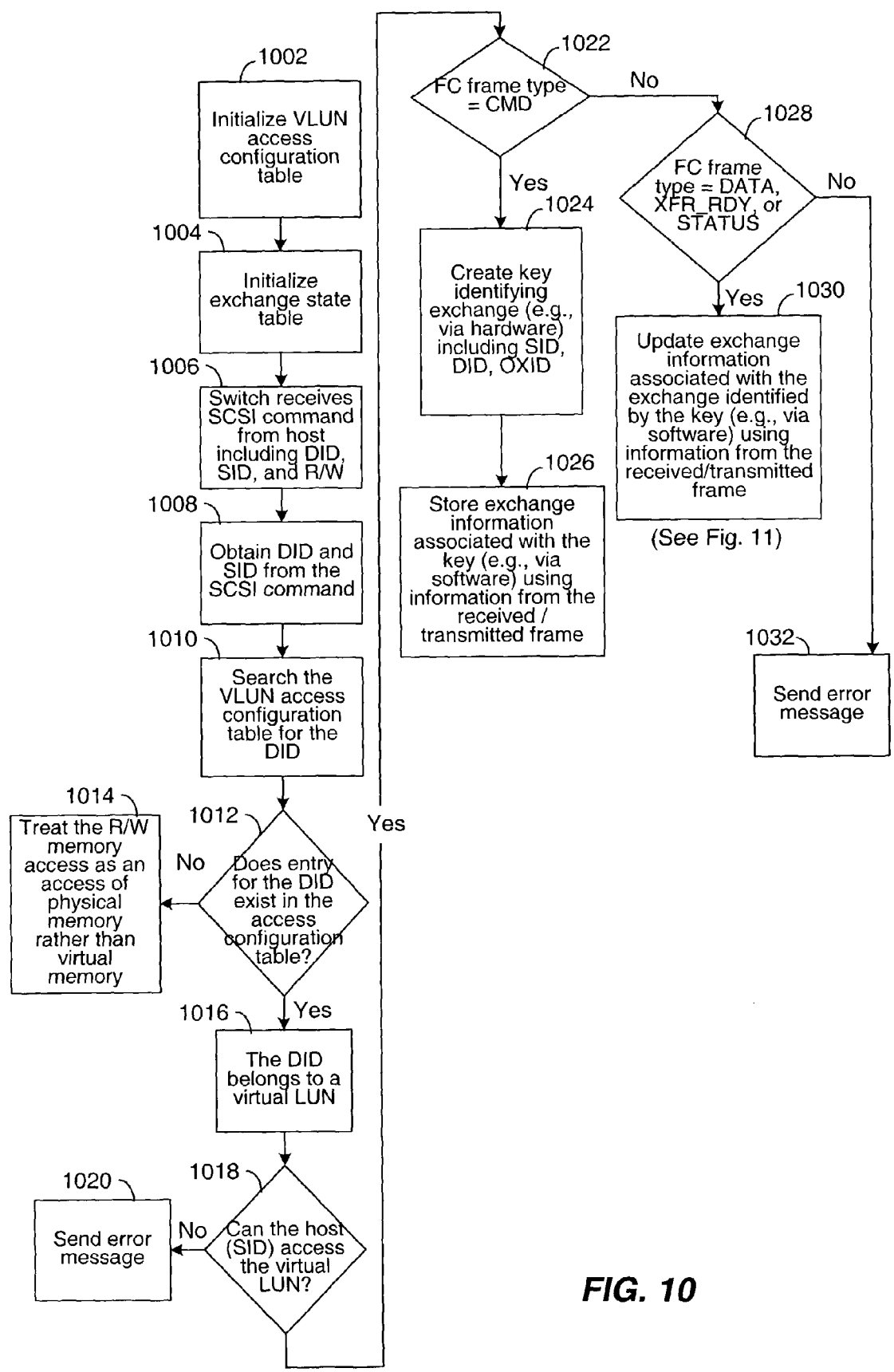
FIG. 10 is a process flow diagram illustrating a method of managing exchanges for virtualization in a SAN in accordance with various embodiments of the invention.

FIG. 10 is a process flow diagram illustrating a method of managing exchanges for virtualization in a SAN in accordance with various embodiments of the invention. A VLUN access configuration table such as that illustrated in FIG. 7 is initialized at block 1002. In addition, an exchange state table such as that illustrated in FIG. 9 may be initialized at block 1004. When the virtualization switch receives a SCSI command from a host at block 1006, the switch obtains the D_ID and S_ID from the SCSI command at block 1008. The switch then searches the VLUN access configuration table at block 1010 to determine whether the host has access to the D_ID. If at block 1012 it is determined that an entry does not exist for the D_ID in the access configuration table, the read/write memory access is treated as an access of physical memory at block 1014 rather than an access of virtual memory. If an entry does exist, the D_ID belongs to a virtual LUN as shown at block 1016. If it is determined at block 1018 that the host (S_ID) cannot access the virtual LUN, a suitable error message is sent to the host at block 1020.

If the host designated by the S_ID can access the virtual LUN designated by the D_ID, the command and subsequent associated frames are processed and the exchange state table is updated accordingly for the host-side and associated disk-side exchanges. More specifically, as described above with reference to FIG. 9, an entry is created and updated for each host-side and disk-side exchange. Thus, at block 1022 when the frame is a command, this is presumably the first frame in an exchange. As a result, a key identifying the exchange is created (e.g., via hardware) at block 1024 as described above and exchange information from the received/transmitted frame is stored at block 1026. In other words, an entry in the exchange state table is created.

When frames in an exchange subsequent to the CMD frame are received or sent, the exchange information in the appropriate entry in the exchange state table is updated. More specifically, when the frame type is DATA, XFR_RDY, or STATUS as shown at block 1028, the exchange information is updated (e.g., via software) at block 1030 using information from the received or transmitted frame. One method of updating exchange information will be described in further detail below with reference to FIG. 11. If the frame type cannot be ascertained, an error message is sent at block 1032.

Figure 11:
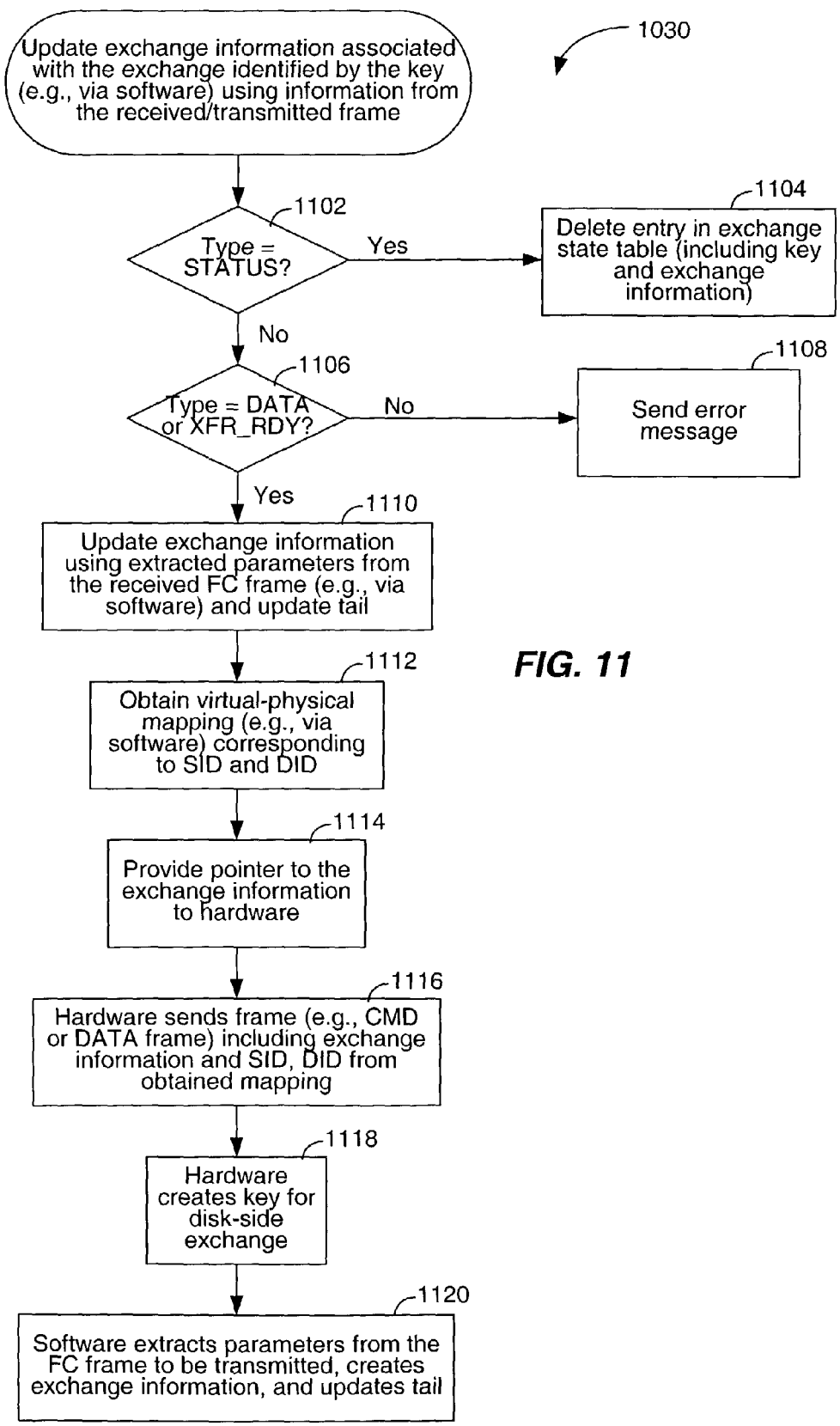
FIG. 11 is a process flow diagram illustrating a method of updating exchange information as shown at block 1030 of FIG. 10.

FIG. 11 is a process flow diagram illustrating a method of updating exchange information as shown at block 1030 of FIG. 10. As shown, when the type of the frame is determined to be a STATUS at block 1102, the exchange information is deleted at block 1104. More specifically, the key and associated entry in the exchange state table are deleted by hardware and software, respectively. This will typically occur in a disk-side exchange. When no other disk-side exchanges are pending, the exchange information for the host-side exchange will also be deleted. This may be determined, for example, by determining whether the head pointer and the tail pointer point to the same exchange entry.

As described above, when the type of the frame is not determined to be type STATUS, DATA or XFR_RDY at block 1106, an error message is sent to the host at block 1108. Otherwise, when the type is DATA or XFR_RDY, the exchange information (for a host or disk-side exchange) is updated at block 1110 using the extracted parameters from the received (or transmitted) frame. For instance, when the received frame is in a host-side exchange, the key associated with the host-side exchange may be identified (e.g., via hardware) so that the entry in the exchange state table is identified. The information in this entry is then updated (e.g., via software). For instance, parameters extracted from the frame received from the host may be used to update selected fields in the exchange state table. The tail pointer is continually updated to point to the last exchange entry created. Thus, the tail pointer initially points to the host-side entry, and is therefore equivalent to the head pointer.

In order to transmit a frame to the disk after receiving a frame in a host-side exchange, or alternatively, to transmit a frame to the host after receiving a frame in a disk-side exchange, a virtual-physical mapping is obtained. For instance, prior to initiating the second exchange (disk-side exchange), the network device obtains a virtual-physical mapping corresponding to the S_ID and the D_ID at block 1112. A pointer to the exchange information (for the host-side exchange) is provided to hardware at block 1114. The hardware sends a frame (e.g., CMD or DATA frame) in a disk-side exchange including selected exchange information from the host-side exchange and a S_ID and D_ID from the above-described virtual-physical mapping at block 1116. The hardware creates a key (or obtains a previously created key) at block 1118 for the disk-side exchange and software extracts parameters from the frame transmitted at block 1116, creates the exchange state table entry for the disk-side exchange including the exchange information and updates the tail to point to the recently created exchange state entry corresponding to the disk-side exchange at block 1120.

Figure 12A:
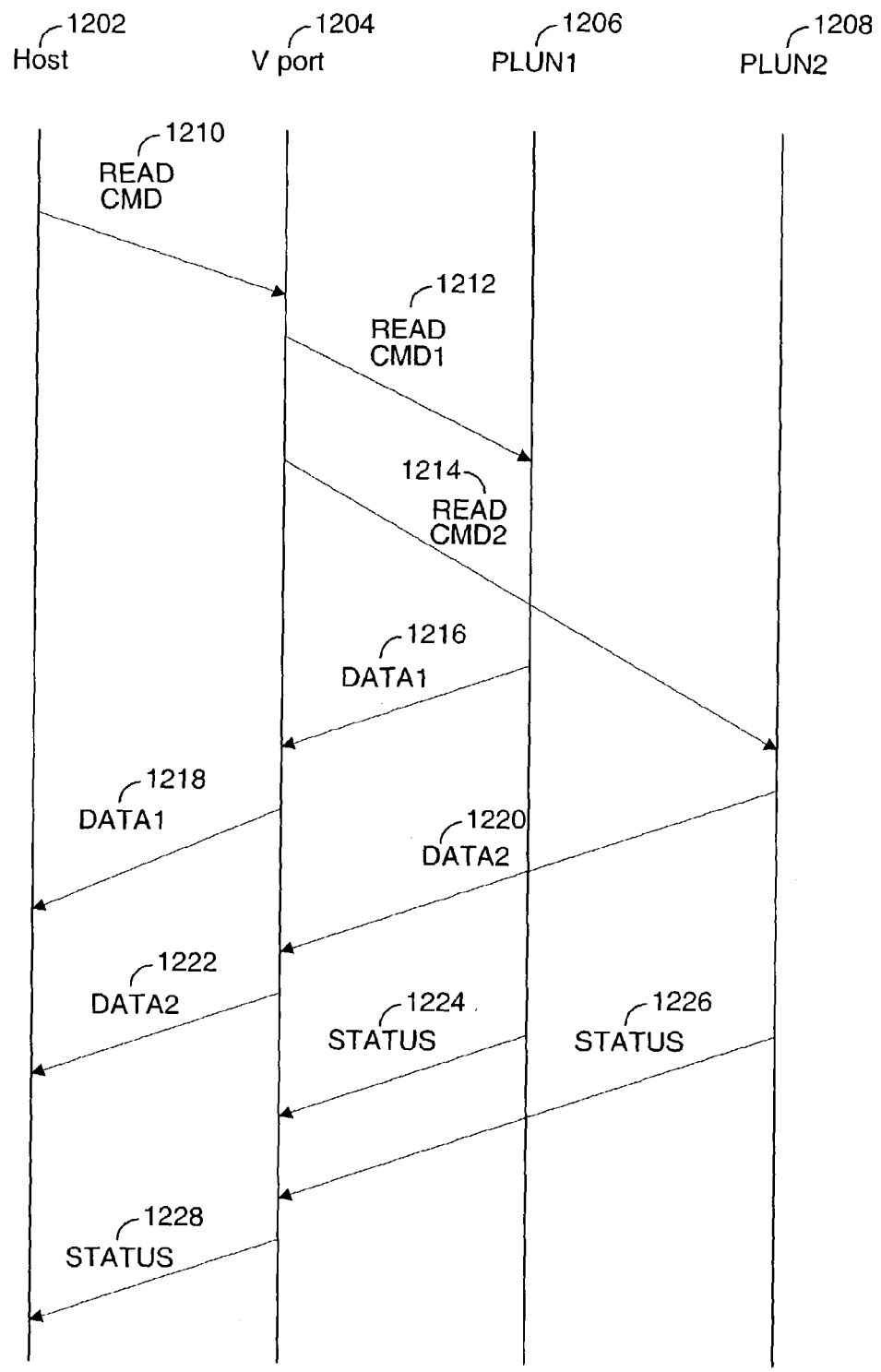
FIG. 12A is a transaction diagram illustrating an exemplary read operation performed in accordance with various embodiments of the invention.

FIG. 12A is a transaction diagram illustrating an exemplary read operation performed in accordance with various embodiments of the invention. Steps performed by the host, virtualization port, PLUN1, and PLUN2 are represented by corresponding vertical lines 1202, 1204, 1206, and 1208, respectively. When the host sends a READ command 1210 directed to a virtual storage location, the virtualization port performs a virtual-physical mapping and sends a READ command 1212 to PLUN1 and a READ command 1212 to PLUN1 and a READ command 1214 to PLUN2. When data (DATA1) is received from PLUN1 at 1216, the data is then sent to the host at 1218. Similarly, when data (DATA2) is received from PLUN2 at 1220, the data is sent to the host at

1222. When a status is received from the PLUNs at 1224 and 1226, the status' are preferably compiled into a single status 1228 that is sent to the host.

Figure 12B:
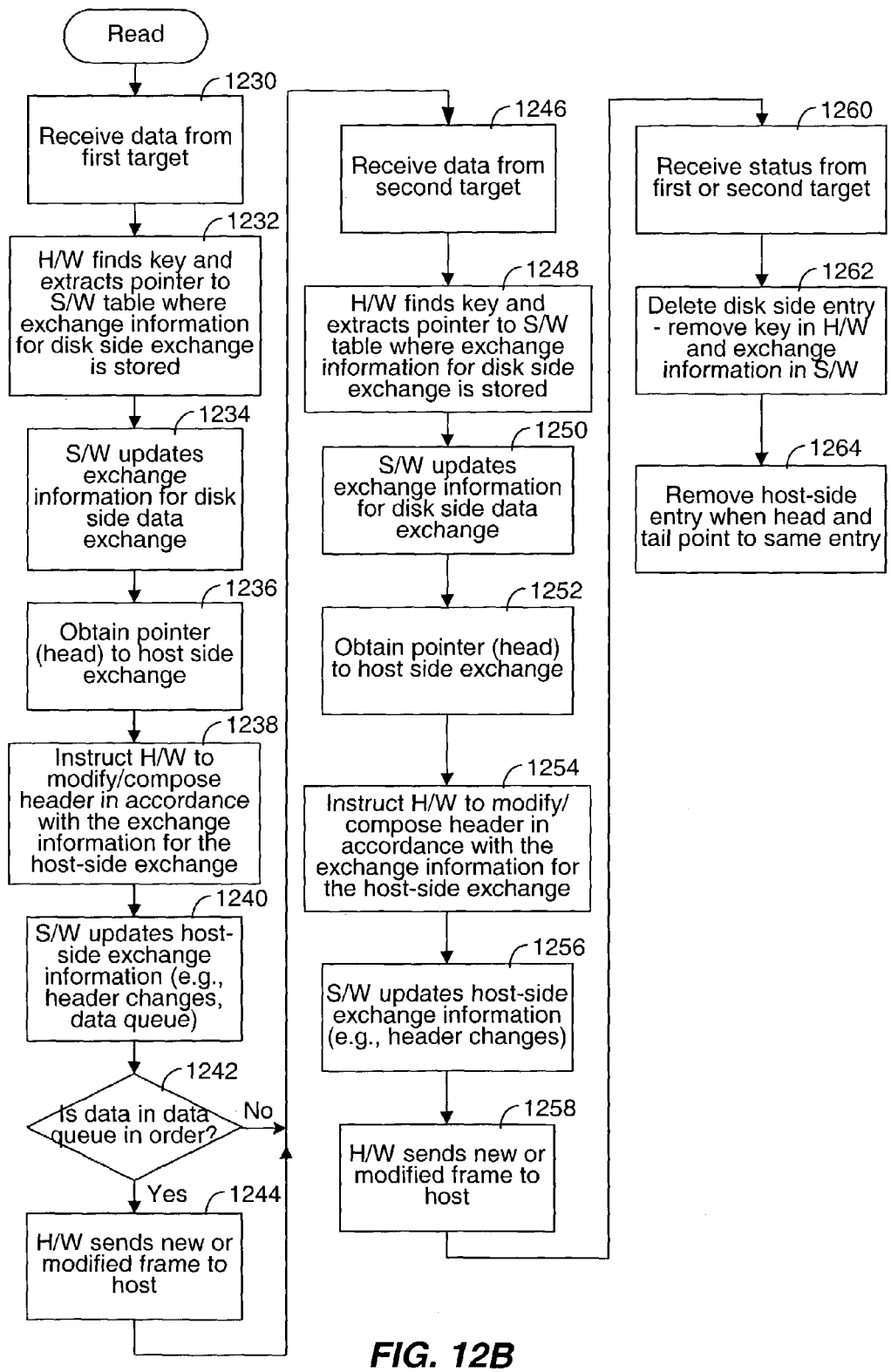
FIG. 12B is a process flow diagram illustrating one method of managing exchanges performed during a read operation such as that presented in FIG. 12A using an exchange state table such as that illustrated in FIG. 9.

FIG. 12B is a process flow diagram illustrating one method of managing exchanges performed during a read operation such as that presented in FIG. 12A using an exchange state table such as that illustrated in FIG. 9. When data is received from the first target (PLUN1) at block 1230, the hardware locates the exchange key to the first disk-side exchange and extracts the pointer to the exchange state table where the exchange information for the disk-side exchange is stored at block 1232. The exchange information for the disk-side data exchange is then updated at block 1234 (e.g., via software). The pointer to the host-side exchange is obtained at block 1236 via the head pointer. The hardware is then instructed to compose/modify a header in accordance with the exchange information for the host-side exchange at block 1238. The host-side exchange information is then updated at block 1240. For instance, the data may be placed in a data queue to ensure that the data is transmitted to the host in the correct order. When it is determined that the data is in the correct order at block 1242, the new or modified frame including DATA1 is transmitted (e.g., via hardware) to the host at block 1244.

When data is received from the first target (PLUN2) at block 1246, the hardware locates the exchange key to the second disk-side exchange and extracts the pointer to the exchange state table where the exchange information for the disk-side exchange is stored at block 1248. The exchange information for the disk-side data exchange is then updated at block 1250 (e.g., via software). The pointer to the host-side exchange is obtained at block 1252 via the head pointer. The hardware is then instructed to compose/modify a header in accordance with the exchange information for the host-side exchange at block 1254. The host-side exchange information is then updated at block 1256. For instance, the data may be placed in a data queue to ensure that the data is transmitted to the host in the correct order. When it is determined that the data is in the correct order, the new or modified frame(s) including the data to be transmitted (e.g., DATA2) is transmitted (e.g., via hardware) to the host at block 1258.

When a STATUS is received from the first or second target (PLUN1 or PLUN2) at block 1260, the associated disk-side entry is deleted. More specifically, the hardware deletes the exchange key and the software deletes the entry in the exchange state table at block 1262. The host-side entry may be removed at block 1264 when there are no pending disk-side entries associated with the host-side entry. For instance, when the head and tail are determined to point to the same entry, the host-side entry may be deleted. As described above, the hardware deletes the exchange key and the software deletes the entry in the exchange state table.

Figure 13A:
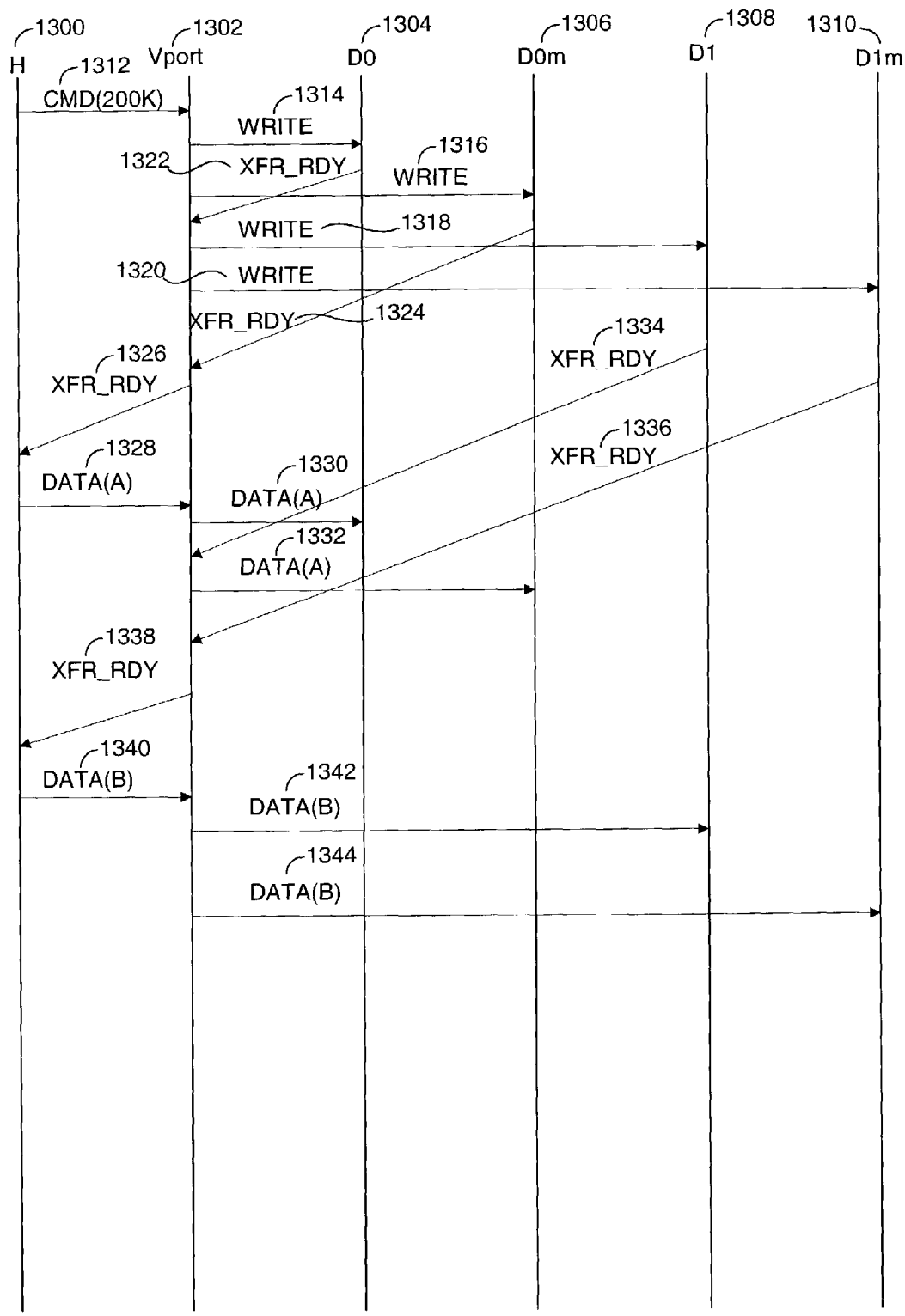
FIG. 13A is a transaction diagram illustrating an exemplary write operation performed in accordance with various embodiments of the invention.

FIG. 13A is a transaction diagram illustrating an exemplary write operation performed in accordance with various embodiments of the invention. In this example, a mirrored write is performed to illustrate multiple disk-side exchanges for a single host-side exchange. Steps performed by a host, virtualization port, physical storage unit D0 and mirrored physical storage unit D0m, physical storage unit D1 and mirrored physical storage unit D1m are represented by vertical lines 1300, 1302, 1304, 1306, 1308, and 1310, respectively.

When the host sends a WRITE command at 1312 indicating that 200K are to be written, the virtualization port performs a virtual-physical mapping as described above, and sends WRITE commands to the physical storage units and associated mirrored physical storage units as shown at 1314-1320. When the virtualization port receives a XFR_RDY command from both mirrors D0 and D0m at 1322 and 1324, it sends a single XFR_RDY command at 1326 to the host. The host then sends DATA(A) at 1328 to the virtualization port. The virtualization port then sends DATA(A) to both mirrors D0 and D0m at 1330 and 1332. Similarly, when the virtualization port receives a XFR_RDY command from both mirrors D1 and D1m at 1334 and 1336, it sends a single XFR_RDY command at 1338 to the host. The host then sends DATA(B) at 1340 to the virtualization port. The virtualization port then sends DATA(B) to both mirrors D1 and D1m at 1342 and 1344.

Figure 13B:
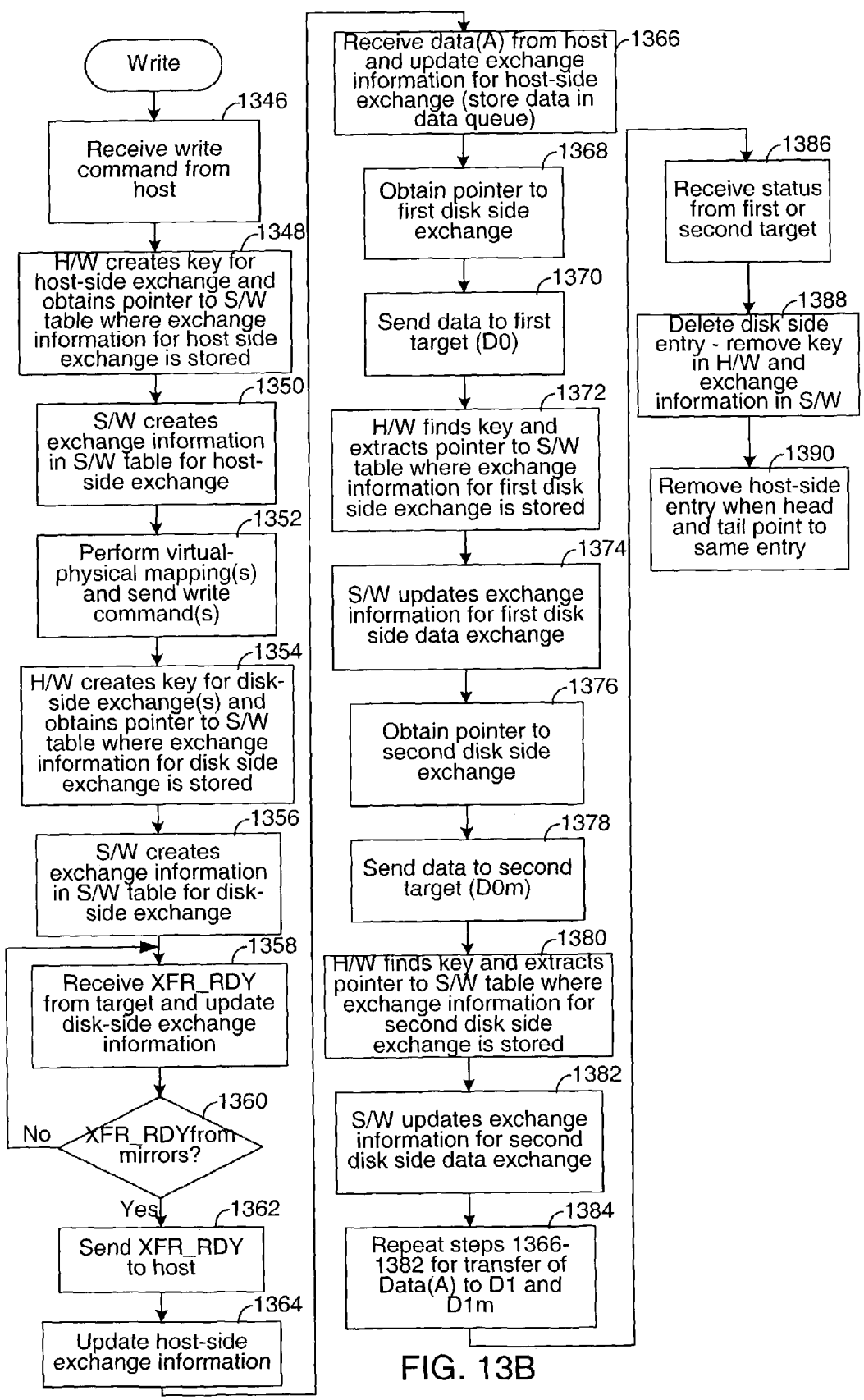
FIG. 13B is a process flow diagram illustrating one method of managing exchanges performed during a write operation such as that presented in FIG. 13A using an exchange state table such as that illustrated in FIG. 9.

FIG. 13B is a process flow diagram illustrating one method of managing exchanges performed during a write operation such as that presented in FIG. 13A using an exchange state table such as that illustrated in FIG. 9. When a WRITE command is received from the host at 1346, the hardware creates a key for the host-side exchange at 1348 and obtains a pointer to the software exchange state table where the exchange information for the host-side exchange is stored. Software creates exchange information in the exchange state table for the host-side exchange at 1350.

When corresponding WRITE commands are sent to the physical storage units, disk-side exchanges are initiated and exchange information is stored for each. More specifically, one or more virtual-physical mapping(s) are performed at 1352 and write command(s) corresponding to these mappings are performed in four separate disk-side exchanges. More specifically, as described above with reference to FIG. 13A, write commands are sent to D0, D0m, D1, D1m. Hardware creates a key for the disk-side exchanges and obtains a pointer to the exchange state table where the exchange information for each of the disk-side exchanges are stored at 1354. Software creates an entry in the exchange state table for each disk-side exchange at 1356.

When XFR_RDY commands are received from the mirrors, these are preferably optimized such that a single XFR_RDY command is sent to the host. Thus, at 1358 when a XFR_RDY command is received from a target, the disk-side exchange information is updated. For instance, the SCSI_S-TATE field of the entry in the exchange state table is updated. When a XFR_RDY command is received from both mirrors at 1360, a XFR_RDY command is sent to the host at 1362 and the host-side exchange information is updated at 1364. Steps 1360-1364 are performed for both sets of mirrors, D0-D0m and D1-D1m.

When DATA(A) is received from the host at 1366, the exchange information for the host-side exchange is updated at 1366. For instance, data A may be stored in the data queue of the host-side entry in the exchange state table to ensure that all data is stored in the appropriate order. The pointer to the first disk-side exchange is obtained at 1368 and DATA(A) is sent to the first target, D0 at 1370. The key for the first disk-side exchange is identified (e.g., via hardware) and the pointer to the exchange state table is extracted at 1372 (e.g., via software). The exchange information for the first disk-side data exchange is then updated at 1374. Similarly, the pointer to the second disk-side is obtained at 1376 and DATA(A) is sent to the second target, D0m at 1378. The key for the second disk-side exchange is identified (e.g., via hardware) and the pointer to the exchange state table is extracted at 1380 (e.g., via software). The exchange information for the second disk-side data exchange is then updated at 1382. Steps 1366-1386 are then repeated at 1384 for DATA(B) sent to targets D1 and D1m for the third and fourth disk-side exchanges.

Upon receiving a status from the first or second target in either of the mirrored WRITE operations at 1386, the appropriate one of the disk-side entries are deleted at 1388. More specifically, the key for the disk-side exchange is removed (e.g., via hardware) and the exchange information is deleted upon deleting the exchange state entry in the exchange state table (e.g., via software) at 1388. The host-side entry that initiated the corresponding disk-side entry is removed when there are no other pending disk-side entries initiated in response to the host-side entry at 1390. More specifically, when the head and tail point to the same entry in the exchange state table, there are no pending disk-side entries since the only entry that remains is the host-side entry. The host-side entry may then be removed.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although various operations are described as being performed by hardware or software, these operations are merely illustrative and therefore these operations may be performed in an alternate manner. More specifically, these operations may be performed by software, hardware, or any combination of hardware and software. Moreover, the present invention would apply regardless of the context and system in which it is implemented. Thus, broadly speaking, the present invention need not be performed using the virtualization operations described above, but may be used to support other virtualization operations in a storage area network. In addition, the disclosed exchange management techniques may be performed in an alternate manner, as well as be implemented using other mechanisms and data structures.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method of managing exchanges in a network device of a storage area network, the network device having a plurality of ports, comprising:
   (a) at least one of receiving one or more frames from an initiator in a first exchange and sending one or more frames to the initiator in the first exchange, the first exchange being initiated by the initiator and being between the initiator and the network device, at least one of the frames pertaining to access of a virtual storage location of a virtual storage unit representing one or more physical storage locations on one or more physical storage units of the storage area network;
   (b) at least one of sending one or more frames from the network device to a target in a second exchange and receiving one or more frames from the target in the second exchange, the second exchange being between the network device and the target and being initiated in response to the first exchange, the target being one of the physical storage units;
   (c) updating exchange information for the first exchange and the second exchange; and
   (d) linking the exchange information for the first exchange to the exchange information for the second exchange;
   wherein the exchange information for the first exchange and the second exchange indicates whether the corresponding exchange is between the initiator and the network device or between the network device and the target;
   wherein (a), (b), (c), and (d) are performed by a processor dedicated to a single one of the plurality of ports of the network device.

2. The method as recited in claim 1, wherein the frames sent and received in the first exchange and the second exchange are fibre channel frames.

3. The method as recited in claim 1, wherein the first exchange is identified by a destination identifier, a source identifier, and an originator exchange identifier.

4. The method as recited in claim 3, wherein the network device is a responder for the first exchange.

5. The method as recited in claim 1, wherein the exchange information for the first exchange and the second exchange comprises a command indicator that indicates whether the corresponding exchange is associated with a read command or a write command.

6. The method as recited in claim 1, wherein the exchange information for the first exchange and the second exchange comprises a command indicator that indicates whether both the exchanges are associated with a read command or a write command.

7. The method as recited as claim 1, wherein physical-virtual limitations are not imposed on all initiators in the storage area network.

8. The method as recited in claim 1, wherein two or more of the plurality of ports of the network device are each configured for performing (a), (b), (c), and (d).

9. The method as recited in claim 1, wherein ports associated with a plurality of network devices in the storage area network are each configured for performing (a), (b), (c), and (d), wherein the network device is one of the plurality of network devices.

10. The method as recited in claim 9, wherein the plurality of network devices are switches.

11. A method of managing exchanges in a network device of a storage area network, the network device having a plurality of ports, comprising:
    (a) receiving one or more frames from an initiator in a first exchange initiated by the initiator, the first exchange being between the initiator and the network device, at least one of the frames pertaining to access of a virtual storage location of a virtual storage unit representing one or more physical storage locations on one or more physical storage units of the storage area network;
    (b) initiating one or more additional exchanges by sending one or more frames from the network device to one or more targets, the additional exchanges each being between the network device and one of the one or more targets and being initiated in response to the first exchange, each of the targets being one of the physical storage units;
    (c) updating exchange information for the first exchange and the additional exchanges; and
    (d) linking the exchange information for the first exchange to the exchange information for the additional exchanges;
    wherein the exchange information for the first exchange and the additional exchanges indicates whether the corresponding exchange is between the initiator and the network device or between the network device and one of the targets;

wherein (a), (b), (c), and (d) are performed by logic dedicated to a single one of the plurality of ports of the network device.

12. The method as recited in claim 11, wherein updating exchange information for the first exchange and the additional exchanges comprises:
    updating the exchange information for the first exchange with information from the received frames; and
    updating the exchange information for one or more additional exchanges with information from the sent frames.

13. The method as recited in claim 11, further comprising:
    sending one or more frames to the initiator in the first exchange; and
    updating the exchange information for the first exchange corresponding to the sent frames, wherein sending and updating the exchange information for the first exchange are performed by the logic dedicated to the port of the network device.

14. The method as recited in claim 11, further comprising:
    receiving one or more frames from each of the targets; and
    updating the exchange information for each of the additional exchanges with information from the frames received from each of the targets, wherein receiving and updating the exchange information for each of the additional exchanges are performed by the logic dedicated to the port of the network device.

15. The method as recited in claim 11, further comprising:
    deleting the exchange information for the first exchange when none of the additional exchanges are pending, wherein deleting is performed by the logic dedicated to the port of the network device.

16. A network device adapted for managing exchanges in a storage area network, comprising:
    a plurality of ports, each of the plurality of ports having a dedicated processor, wherein at least one of the plurality of ports is each configured for:
    (a) at least one of receiving one or more frames from an initiator in a first exchange and sending one or more frames to the initiator in the first exchange, the first exchange being initiated by the initiator and being between the initiator and the network device, at least one of the frames pertaining to access of a virtual storage location of a virtual storage unit representing one or more physical storage locations on one or more physical storage units of the storage area network;
    (b) at least one of sending one or more frames from the network device to a target in a second exchange and receiving one or more frames from the target in the second exchange, the second exchange being between the network device and the target and being initiated in response to the first exchange, the target being one of the physical storage units;
    (c) updating exchange information for the first exchange and the second exchange; and
    (d) linking the exchange information for the first exchange to the exchange information for the second exchange;
    wherein the exchange information for the first exchange and the second exchange indicates whether the corresponding exchange is between an initiator and the network device or between the network device and a target;
    wherein (a), (b), (c), and (d) are performed by the processor dedicated to the corresponding one of the plurality of ports of the network device.

17. The network device as recited in claim 16, wherein the steps are performed in a fibre channel network.

18. The network device as recited in claim 16, at least one of the processor or the memory being further adapted for:
    determining that the frames received from the initiator in the first exchange pertain to access of a virtual storage location of a virtual storage unit representing one or more physical storage locations on one or more physical storage units of the storage area network; and
    obtaining a virtual-physical mapping between the one or more physical storage locations and the virtual storage location, wherein the determining and obtaining steps are performed by the logic dedicated to the port of the network device;
    wherein sending one or more frames from the network device to a target in the second exchange comprises sending a new or modified frame to a target specified by the virtual-physical mapping.

19. The network device as recited in claim 18, wherein the first exchange is identified by a destination identifier, a source identifier, and an originator exchange identifier, wherein updating exchange information comprises:
    updating at least one of the destination identifier or the source identifier corresponding to the virtual-physical mapping.

20. The network device as recited in claim 16, wherein updating exchange information for the first exchange and the second exchange comprises:
    storing information from one of the received or sent frames in the corresponding exchange.

21. The network device as recited in claim 16, wherein the second exchange is identified by a destination identifier, a source identifier, and an originator exchange identifier that identifies the originator of the exchange.

22. The network device as recited in claim 21, wherein the network device is the originator of the exchange.

23. The network device as recited in claim 16, wherein the exchange information for the first exchange and the second exchange indicates whether the corresponding exchange is associated with a read command or a write command.

24. The network device as recited in claim 23, at least one of the processor or the memory being further adapted for:
    composing one or more frames to be sent in the first exchange based on exchange information for the second exchange, wherein composing is performed by the logic dedicated to the port of the network device.

25. The network device as recited in claim 23, at least one of the processor or the memory being further adapted for:
    composing one or more frames to be sent in the second exchange based on exchange information for the first exchange, wherein composing is performed by the logic dedicated to the port of the network device.

26. The network device as recited in claim 16, wherein the exchange information for the first exchange and the second exchange comprises a frame indicator indicating whether the last frame received in the corresponding exchange is the last frame in the sequence.

27. The network device as recited in claim 16, wherein updating exchange information for the first exchange and the second exchange comprises:
    updating sequence information for one or more sequences in the corresponding exchange, wherein updating sequence information is performed by the logic dedicated to the port of the network device.

28. The network device as recited in claim 27, wherein updating sequence information comprises:
   storing a sequence identifier from one of the received or sent frames, the sequence identifier identifying which sequence of the corresponding exchange the frame belongs to.

29. The network device as recited in claim 27, wherein updating sequence information comprises
   storing a sequence counter from one of the received or sent frames, the sequence counter indicating a number of frames in the sequence.

30. The network device as recited in claim 16, wherein updating exchange information for the first exchange and the second exchange comprises:
   updating a SCSI state for the corresponding exchange.

31. The network device as recited in claim 30, where the SCSI state comprises one of CMD, DATA, or RESPONSE.

32. The network device as recited in claim 31, wherein the RESPONSE is XFR_RDY or STATUS.

33. The network device as recited in claim 16, wherein updating exchange information for the first exchange and the second exchange comprises:
   storing an address in memory where data is to be read from or written to.

34. The network device as recited in claim 33, wherein the address is a logical address.

35. The network device as recited in claim 16, wherein updating exchange information for the first exchange and the second exchange comprises:
   indicating an amount of data to be transferred in the corresponding exchange.

36. The network device as recited in claim 16, wherein updating exchange information for the first exchange and the second exchange comprises:
   indicating an amount of data that has been transferred in the corresponding exchange.

37. The network device as recited in claim 16, wherein updating exchange information for the first exchange and the second exchange comprises:
   storing data received by the network device in the first exchange to be transferred in the second exchange.

38. The network device as recited in claim 37, wherein storing data comprises:
   storing data from one or more received frames in the first exchange.

39. The network device as recited in claim 16, wherein updating exchange information for the first exchange and the second exchange comprises:
   storing data received by the network device in the second exchange to be transferred in the first exchange.

40. The network device as recited in claim 39, wherein storing data comprises:
   storing data from one or more received frames in the second exchange.

41. The network device as recited in claim 16, wherein updating the exchange information for the first exchange and the second exchange comprises:
   indicating a command to be performed during the corresponding exchange.

42. The network device as recited in claim 41, wherein the command is a READ command or a WRITE command.

43. The network device as recited in claim 16, at least one of the processor or the memory being further adapted for:
   composing one or more frames to be sent in the first exchange based on exchange information for the second exchange, wherein composing is performed by the logic dedicated to the port of the network device.

44. The network device as recited in claim 43, wherein updating exchange information comprises:
   updating the exchange information for the first exchange, wherein updating is performed by the logic dedicated to the port of the network device.

45. The network device as recited in claim 16, at least one of the processor or the memory being further adapted for:
   composing one or more frames to be sent in the second exchange based on exchange information for the first exchange, wherein composing is performed by the logic dedicated to the port of the network device.

46. The network device as recited in claim 45, wherein updating exchange information comprises:
   updating the exchange information for the second exchange.

47. The network device as recited in claim 16, at least one of the processor or the memory being further adapted for creating a key identifying the corresponding exchange and associating the key with the exchange information for the corresponding exchange when one of the received frames in the first exchange or one of the sent frames in the second exchange comprises a command, wherein creating a key is performed by the logic dedicated to the port of the network device.

48. The network device as recited in claim 47, wherein the key comprises a destination identifier, a source identifier, and an originator exchange identifier.

49. The network device as recited in claim 47, wherein the command is a READ command or a WRITE command.

50. The network device as recited in claim 16, at least one of the processor or the memory being further adapted for deleting the exchange information for the second exchange when one of the received frames in the second exchange comprises a status, wherein deleting the exchange information for the second exchange is performed by the logic dedicated to the port of the network device.

51. The network device as recited in claim 50, at least one of the processor or the memory being further adapted for:
   deleting the exchange information for the first exchange, wherein deleting the exchange information for the first exchange is performed by the logic dedicated to the port of the network device.

52. A network device adapted for managing exchanges in a storage area network, the network device having a plurality of ports, comprising:
   (a) means for at least one of receiving one or more frames from an initiator in a first exchange and sending one or more frames to the initiator in the first exchange, the first exchange being initiated by the initiator and being between the initiator and the network device, at least one of the frames pertaining to access of a virtual storage location of a virtual storage unit representing one or more physical storage locations on one or more physical storage units of the storage area network;
   (b) means for at least one of sending one or more frames from the network device to a target in a second exchange and receiving one or more frames from the target in the second exchange, the second exchange being between the network device and the target and being initiated in response to the first exchange, the target being one of the physical storage units;
   (c) means for updating exchange information for the first exchange and the second exchange; and
   (d) means for linking the exchange information for the first exchange to the exchange information for the second exchange;

wherein the exchange information for the first exchange and the additional exchanges indicates whether the corresponding exchange is between the initiator and the network device or between the network device and one of the targets;

wherein (a), (b), (c), and (d) are performed by logic dedicated to a single one of the plurality of ports of the network device.

53. An apparatus, comprising:
a plurality of ports, each of the plurality of ports having a processor, one or more of the plurality of ports each being adapted for:
   (a) at least one of receiving one or more frames from an initiator in a first exchange and sending one or more frames to the initiator in the first exchange, the first exchange being initiated by the initiator and being between the initiator and the network device, at least one of the frames pertaining to access of a virtual storage location of a virtual storage unit representing one or more physical storage locations on one or more physical storage units of the storage area network;
   (b) at least one of sending one or more frames from the network device to a target in a second exchange and receiving one or more frames from the target in the second exchange, the second exchange being between the network device and the target and being initiated in response to the first exchange, the target being one of the physical storage units;
   (c) updating exchange information for the first exchange and the second exchange; and
   (d) linking the exchange information for the first exchange to the exchange information for the second exchange;
   wherein the exchange information for the first exchange and the second exchange indicates whether the corresponding exchange is between an initiator and the network device or between the network device and a target.

54. The apparatus as recited in claim 53, wherein at least one of the plurality of ports is not adapted for performing (a), (b), (c), and (d).

55. A network device adapted for managing exchanges in a storage area network, comprising:
   (a) means for receiving one or more frames from an initiator in a first exchange initiated by the initiator, the first exchange being between the initiator and the network device, at least one of the frames pertaining to access of a virtual storage location of a virtual storage unit representing one or more physical storage locations on one or more physical storage units of the storage area network;
   (b) means for initiating one or more additional exchanges by sending one or more frames from the network device to one or more targets, the additional exchanges each being between the network device and one of the one or more targets and being initiated in response to the first exchange, each of the targets being one of the physical storage units;
   (c) means for updating exchange information for the first exchange and the additional exchanges; and
   (d) means for linking the exchange information for the first exchange to the exchange information for the additional exchanges;
   wherein the exchange information for the first exchange and the additional exchanges indicates whether the corresponding exchange is between the initiator and the network device or between the network device and one of the targets;
   wherein (a), (b), (c), and (d) are performed by logic dedicated to a single one of a plurality of ports of the network device.

56. A network device adapted for managing exchanges in a storage area network, comprising:
a processor; and
a memory, at least one of the processor or the memory being adapted for:
   (a) receiving one or more frames from an initiator in a first exchange initiated by the initiator, the first exchange being between the initiator and the network device, at least one of the frames pertaining to access of a virtual storage location of a virtual storage unit representing one or more physical storage locations on one or more physical storage units of the storage area network;
   (b) initiating one or more additional exchanges by sending one or more frames from the network device to one or more targets, the additional exchanges each being between the network device and one of the one or more targets and being initiated in response to the first exchange, each of the targets being one of the physical storage units;
   (c) updating exchange information for the first exchange and the additional exchanges; and
   (d) linking the exchange information for the first exchange to the exchange information for the additional exchanges;
   wherein the exchange information for the first exchange and the additional exchanges indicates whether the corresponding exchange is between the initiator and the network device or between the network device and one of the targets;
   wherein (a), (b), (c), and (d) are performed by logic dedicated to a single one of a plurality of ports of the network device.

57. The network device as recited in claim 56, wherein at least one of the plurality of ports do not have logic dedicated to performing (a), (b), (c), and (d).

58. The network device as recited in claim 56, wherein two or more of the plurality of ports each have dedicated logic for performing (a), (b), (c), and (d).

59. The network device as recited in claim 56, wherein each of the plurality of ports each has dedicated logic for performing (a), (b), (c), and (d).

60. An apparatus, comprising:
a plurality of ports, each of the plurality of ports having a processor associated therewith, wherein one or more of the plurality of ports is each configured for:
   (a) receiving one or more frames from an initiator in a first exchange initiated by the initiator, the first exchange being between the initiator and the network device, at least one of the frames pertaining to access of a virtual storage location of a virtual storage unit representing one or more physical storage locations on one or more physical storage units of the storage area network;
   (b) initiating one or more additional exchanges by sending one or more frames from the network device to one or more targets, the additional exchanges each being between the network device and one of the one or more targets and being initiated in response to the first exchange, each of the targets being one of the physical storage units;
   (c) updating exchange information for the first exchange and the additional exchanges; and
   (d) linking the exchange information for the first exchange to the exchange information for the additional exchanges;

wherein the exchange information for the first exchange and the additional exchanges indicates whether the corresponding exchange is between the initiator and the network device or between the network device and one of the targets.

61. The apparatus as recited in claim 60, wherein at least one of the plurality of ports are not configured to perform steps (a), (b), (c), and (d).

62. The apparatus as recited in claim 60, wherein the apparatus is a switch.

63. A system, comprising:
a plurality of network devices, each of the plurality of network devices having a plurality of ports, each of the plurality of ports having a processor associated therewith, wherein one or more of the plurality of ports of each of the plurality of network devices is each configured for:
  (a) receiving one or more frames from an initiator in a first exchange initiated by the initiator, the first exchange being between the initiator and the network device, at least one of the frames pertaining to access of a virtual storage location of a virtual storage unit representing one or more physical storage locations on one or more physical storage units of the storage area network;
  (b) initiating one or more additional exchanges by sending one or more frames from the network device to one or more targets, the additional exchanges each being between the network device and one of the one or more targets and being initiated in response to the first exchange, each of the targets being one of the physical storage units;
  (c) updating exchange information for the first exchange and the additional exchanges; and
  (d) linking the exchange information for the first exchange to the exchange information for the additional exchanges;
wherein the exchange information for the first exchange and the additional exchanges indicates whether the corresponding exchange is between the initiator and the network device or between the network device and one of the targets.

64. The system as recited in claim 63, wherein each of the plurality of network devices is a switch.

* * * * *